(12) United States Patent
Thyamagondlu et al.

(10) Patent No.: US 10,924,430 B2
(45) Date of Patent: Feb. 16, 2021

(54) STREAMING PLATFORM FLOW AND ARCHITECTURE FOR AN INTEGRATED CIRCUIT

(71) Applicant: Xilinx, Inc., San Jose, CA (US)

(72) Inventors: Chandrasekhar S. Thyamagondlu, Sunnyvale, CA (US); Hem C. Neema, San Jose, CA (US); Kenneth K. Chan, Saratoga, CA (US); Ravi N. Kurlagunda, Fremont, CA (US); Karen Xie, Milpitas, CA (US); Sonal Santan, San Jose, CA (US); Lizhi Hou, Dublin, CA (US)

(73) Assignee: Xilinx, Inc., San Jose, CA (US)

( * ) Notice: Subject to any disclaimer, the term of this patent is extended or adjusted under 35 U.S.C. 154(b) by 141 days.

(21) Appl. No.: 16/186,102

(22) Filed: Nov. 9, 2018

(65) Prior Publication Data
US 2020/0153756 A1 May 14, 2020

(51) Int. Cl.
| | |
|---|---|
| H04L 12/933 | (2013.01) |
| H04L 12/861 | (2013.01) |
| G06F 13/16 | (2006.01) |
| G06F 13/28 | (2006.01) |

(52) U.S. Cl.
CPC .......... *H04L 49/109* (2013.01); *G06F 13/161* (2013.01); *G06F 13/1647* (2013.01); *G06F 13/28* (2013.01); *H04L 49/9047* (2013.01)

(58) Field of Classification Search
CPC combination set(s) only.
See application file for complete search history.

(56) References Cited

U.S. PATENT DOCUMENTS

| | | | |
|---|---|---|---|
| 7,577,707 B2 | 8/2009 | Hufferd et al. | |
| 7,590,790 B2 | 9/2009 | Wang et al. | |
| 7,752,349 B2 | 7/2010 | Ishida et al. | |
| 8,504,373 B2 | 8/2013 | Bansal et al. | |
| 2003/0021346 A1* | 1/2003 | Bixby | H04N 21/23424 375/240.25 |
| 2003/0097498 A1* | 5/2003 | Sano | H04L 49/602 710/22 |
| 2004/0019729 A1* | 1/2004 | Kelley | G06F 13/4036 710/306 |

(Continued)

FOREIGN PATENT DOCUMENTS

WO 2010/012568 A1 2/2010

OTHER PUBLICATIONS

U.S. Appl. No. 16/186,055, filed Nov. 9, 2018, Thyamagondlu et al., "Streaming Platform Architecture for Inter-kernel Circuit Communication", San Jose, CA USA.

(Continued)

*Primary Examiner* — Raymond N Phan
(74) *Attorney, Agent, or Firm* — Kevin T. Cuenot

(57) ABSTRACT

A system includes a host system and an integrated circuit coupled to the host system through a communication interface. The integrated circuit is configured for hardware acceleration. The integrated circuit includes a direct memory access circuit coupled to the communication interface, a kernel circuit, and a stream traffic manager circuit coupled to the direct memory access circuit and the kernel circuit. The stream traffic manager circuit is configured to control data streams exchanged between the host system and the kernel circuit.

19 Claims, 7 Drawing Sheets

(56) References Cited

U.S. PATENT DOCUMENTS

| | | |
|---|---|---|
| 2005/0114566 A1* | 5/2005 | Chen ................... G06F 11/2076 |
| | | 710/38 |
| 2005/0228913 A1 | 10/2005 | Matthews et al. |
| 2006/0265531 A1 | 11/2006 | Adams et al. |
| 2007/0208895 A1 | 9/2007 | Chang et al. |
| 2010/0186014 A1* | 7/2010 | Vaghani ................ G06F 3/0604 |
| | | 718/101 |
| 2010/0321397 A1* | 12/2010 | Ginzburg .............. G06F 12/109 |
| | | 345/531 |
| 2013/0160016 A1* | 6/2013 | Gummaraju .......... G06F 9/5044 |
| | | 718/102 |
| 2015/0134891 A1 | 5/2015 | Jo |
| 2016/0203091 A1 | 7/2016 | Lee |
| 2017/0206169 A1* | 7/2017 | Coppola ............. G06F 9/44505 |
| 2019/0065290 A1 | 2/2019 | Custodio et al. |
| 2019/0138493 A1* | 5/2019 | Teh ..................... G06F 13/1673 |

OTHER PUBLICATIONS

Ravi Sunkavalli: "Network Acceleration", Xilinx Developer Forum 2018 (Silicon Valley). Oct. 1, 2018 (Oct. 1, 2018) , XP05568-4236 ,Retrieved from the Internet: URL: https://www.xilinx.com/content/dam/xilinx/imgs/developer-forum/2018-silicon-valley/Cloud-Converged-l0-Acceleration- Platform. pdf [retrieved on Apr. 8, 2008] p. 5-p. 13.

* cited by examiner

US 10,924,430 B2

STREAMING PLATFORM FLOW AND ARCHITECTURE FOR AN INTEGRATED CIRCUIT

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to integrated circuits (ICs) and, more particularly, to using data streams for communications between a host system and hardware accelerated circuitry and for communication between kernel circuits of the hardware accelerated circuitry.

BACKGROUND

Hardware acceleration refers to implementing the functionality of a portion of program code in hardware or circuitry. The hardware accelerated program code is functionally equivalent to the original program code. Instead of executing a compiled version of the program code such as an executable binary using a processor, the program code is implemented as circuitry configured to provide the same functionality as the executable binary. The hardware accelerated version of the program code usually provides improved performance compared to executing the program code using some sort of processor. In some cases, the program code is compiled into a circuit design that is implemented within a programmable IC.

SUMMARY

In one or more embodiments, a system includes a host system and an integrated circuit (IC) coupled to the host system through a communication interface. The IC is configured for hardware acceleration. The IC includes a direct memory access circuit coupled to the communication interface, a kernel circuit, and a stream traffic manager circuit coupled to the direct memory access circuit and the kernel circuit. The stream traffic manager circuit is configured to control data streams exchanged between the host system and the kernel circuit.

In one or more embodiments, a method includes selecting, using computer hardware, a container file including a configuration bitstream specifying a kernel circuit and metadata for the kernel circuit, extracting, using the computer hardware, the configuration bitstream from the container file and loading the configuration bitstream within an IC to implement the kernel circuit within the IC, and determining, using the computer hardware, pipe properties from the metadata, wherein the pipe properties specify settings for streaming data to the kernel circuit from a host system. The method can also include implementing a data transfer directly from the host system to the kernel circuit as packetized data that is converted to a data stream and provided to the kernel circuit using the settings specified by the pipe properties.

In one or more embodiments, an IC includes a communication interface coupled to a host system, a direct memory access circuit coupled to the communication interface, a kernel circuit implemented using programmable circuitry, and a stream traffic manager circuit coupled to the direct memory access circuit and the kernel circuit. The stream traffic manager circuit is configured to control data streams exchanged between the host system and the kernel circuit.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
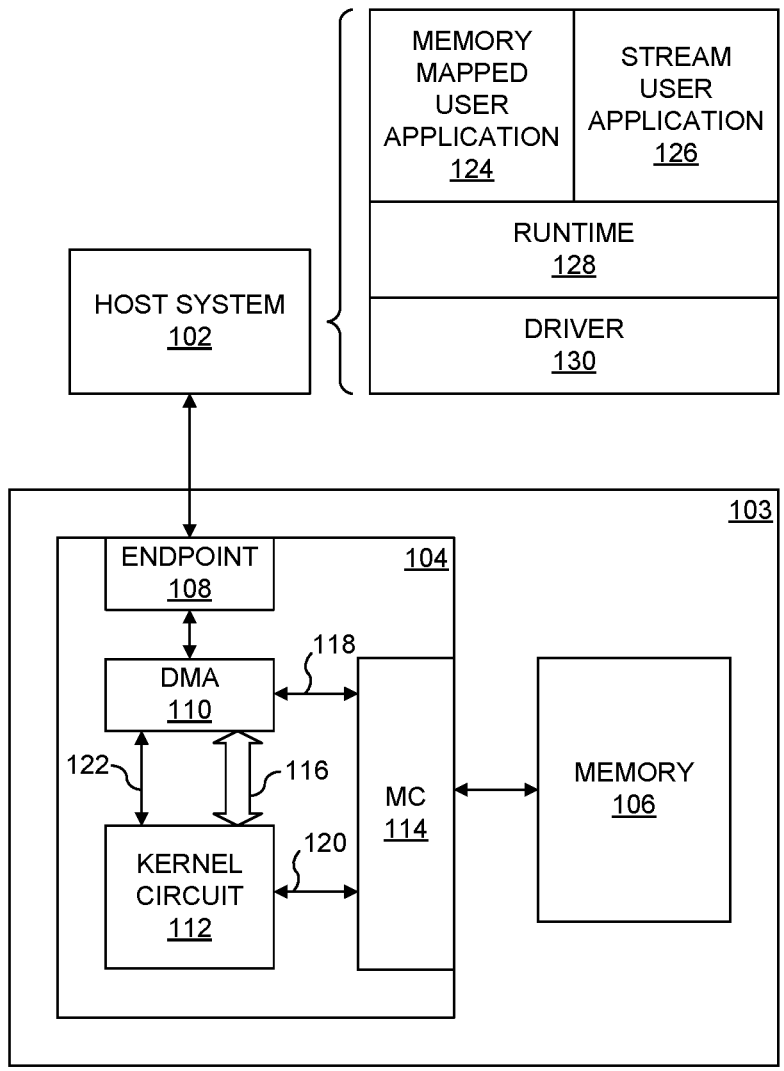
FIG. 1 illustrates an example architecture for hardware acceleration.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to ICs and, more particularly, to using data streams for communications between a host system and hardware accelerated circuitry and for communication between kernel circuits of the hardware accelerated circuitry. An IC implements hardware accelerated circuitry as one or more kernel circuits. For example, each kernel circuit represents hardware accelerated program code. The host system is capable of offloading one or more tasks to the kernel circuits implemented within the IC. In doing so, the host system transfers the data to be operated on by the kernel circuits using an architecture that supports data streams. The kernel circuits are capable of exchanging data with one another using the data stream enabled architecture. The kernel circuits also transfer data, e.g., results, to the host system as data streams that are packetized prior to sending to the host system.

In conventional systems, when offloading a task to a kernel circuit, the host system initiates a data transfer to the kernel circuit by way of a random-access memory (RAM) that is coupled to the IC that implements the kernel circuit. The RAM, however, while located on the same circuit board (e.g., accelerator card), is not in the same IC as the kernel circuit. Once the data is transferred to the RAM, the host system notifies the kernel circuit that the data is ready for use. This means that the kernel circuit is unable to begin operating on the data until the data transfer to the RAM is complete. Any instructions provided from the host system to the kernel circuit are provided separately, e.g., out-of-band, relative to the data. For example, the commands are provided to the kernel circuit over a different physical interface than is used to convey the data.

In conventional systems, the kernel circuit, once notified of the availability of the data, reads the data from the RAM, processes the data, and writes the results back to the RAM. When the kernel circuit is finished writing results to the RAM, the kernel circuit notifies the host system of the availability of the results. The host system then retrieves the results from the RAM.

In accordance with the inventive arrangements described within this disclosure, data is exchanged between the host system and the kernel circuits using data streams and packetization. Data originated by the host system are sent directly to the kernel circuits. Similarly, data originated by the kernel circuits are sent directly to the host system. As an illustrative and nonlimiting example, data transfers from the host system to kernel circuits flow directly from the host system to the kernel circuits. The data that is transferred from the host system is not first stored and accumulated in the off-chip RAM and then read by the kernel circuits. Similarly, the results that are transferred from the kernel circuits to the host system are not first stored and accumulated in the off-chip RAM before being provided to the host system. Instead, the data flows directly from the kernel circuits to the host system. Streaming is performed over a data path within the IC that utilizes one or more smaller internal memory buffers. The memory buffers, for example, are smaller in size than the amount of data exchanged between host system and the kernel circuits.

A streaming architecture as described within this disclosure facilitates faster data transfers, less latency, and more efficient usage of memory compared to conventional systems. For example, kernel circuits can begin operation on data immediately upon receipt of less than the entirety of the data rather than waiting for the entirety of the data to be first transferred to the off-chip RAM and then loaded into the kernel circuit. This improves speed and latency of the overall system. Similar gains in speed and latency are obtained by streaming data from the kernel circuits to the host system. Using a streaming architecture, commands from the host system to the kernel circuits may be included in the data streams themselves, e.g., in-banded, which further reduces system latency. By utilizing internal memory of the IC more efficiently, less off-chip RAM is required, which reduces the power requirements of the system and/or hardware accelerator.

In particular embodiments, kernel circuits are also capable of communicating with one another using data streams. The benefits described relating to host system—kernel circuit communications are also attained by using data streams for communication among kernel circuits. Further, by including a streaming infrastructure within the programmable IC(s), kernel circuits are capable of exchanging data with one another using a less complex infrastructure, e.g., one that does not require direct point-to-point communication links among kernel circuits intended to communicate with one another.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example architecture 100 for hardware acceleration. Architecture 100 includes a host system 102 and a hardware accelerator 103. Host system 102 is implemented as a computer system such as a server or other data processing system. Hardware accelerator 103 is implemented as a circuit board having an IC 104 and a memory 106 attached thereto. For example, hardware accelerator 103 may be implemented as an accelerator card having an edge connector that can be inserted into an available peripheral slot of host system 102.

While the example of FIG. 1 is described using memory (e.g., a RAM) that is external to IC 104, the embodiments described herein relating to streaming data are also effective and applicable in cases where IC 104 includes sufficient on-chip memory such that memory 106 is not needed. In cases where IC 104 includes sufficient on-chip or same die memory, issues similar to those involving an external memory arise when data must be transferred in its entirety to the memory before a kernel circuit is permitted to operate on the data. Though using internal memory is faster than using an external memory, issues such as increased latency, the need for increased storage capacity (memory), and synchronization occur that are overcome by the streaming enabled embodiments described herein.

In one or more embodiments, IC 104 is implemented as a programmable IC. In particular embodiments, IC 104 is implemented using an architecture the same as or similar to that described in connection with FIG. 7. In the example of FIG. 1, IC 104 includes an endpoint 108, direct memory access circuit (DMA) 110, a kernel circuit 112, and a memory controller 114. Endpoint 108 is an interface that is capable of communicating over a communications bus with host system 102. As an illustrative and nonlimiting example, the communications bus may be implemented as a Peripheral Component Interconnect Express (PCIe) bus. As such, endpoint 108 may be implemented as a PCIe endpoint. It should be appreciated, however, that other communication buses may be used and that the examples provided are not intended to be limiting. Accordingly, endpoint 108 can be implemented as any of a variety of suitable interfaces for communicating over a communication bus.

Endpoint 108 is coupled to DMA 110. DMA 110 is also coupled to kernel circuit 112 and to memory controller 114 (abbreviated as "MC" in FIG. 1). In particular embodiments, DMA 110 includes two independent channels supporting bidirectional communication with endpoint 108 and with kernel circuit 112. In the example of FIG. 1, DMA 110 is coupled to kernel circuit 112 through one or more interfaces 116. As such, host system 102 is capable of transferring data to kernel circuit 112 by way of endpoint 108 and DMA 110 as packetized data that is converted to one or more data streams before being provided to kernel circuit 112. Similarly, kernel circuit 112 is capable of transferring data to host system 102 by outputting a data stream that is packetized prior to being provided to host system 102 by way of DMA 110 and endpoint 108. Further details relating to the transfer of data are described in greater detail in connection with FIG. 2. In general, one data stream, whether originating in host system 102 or from kernel circuit 112 is converted into a plurality of packets, though there may be occasions where a data stream is converted into a single packet depending on the size of the data stream (e.g., where the data stream conveys a lesser amount of data).

An example of interface 116 is a stream-enabled on-chip interconnect such as an Advanced Microcontroller Bus Architecture (AMBA®) Advanced Extensible Interface (AXI) stream interconnect. An AXI-stream interconnect enables connection of heterogeneous master/slave AMBA® AXI-stream protocol compliant circuit blocks. Interface 116 is capable of routing connections conveying packetized data from one or more masters to one or more slaves. AXI is provided for purposes of illustration and is not intended to be limiting. It should be appreciated that interface 116 can be implemented as any of a variety of interconnects. For example, interface 116 can be implemented as a bus, a network-on-chip (NoC), a cross-bar, a switch, or other type of interconnect.

In one or more embodiments, memory controller 114 is coupled to memory 106. Memory 106 is implemented as a RAM. Memory controller 114 may be multi-ported and is coupled to DMA 110 and to kernel circuit 112. Memory controller 114 is capable of accessing (e.g., reading and/or writing) memory 106 under control of DMA 110 and/or kernel circuit 112. For example, DMA 110 is coupled to memory controller 114 through a memory mapped interface 118. Similarly, kernel circuit 112 is coupled to memory controller 114 through a memory mapped interface 120. DMA 110 is coupled to kernel circuit 112 via a control interface 122. In one or more embodiments, control interface 122 is implemented as an AXI-Lite interface that is configured to provide point-to-point bidirectional communication with a circuit block. AXI-Lite can be used as a control interface for kernel circuit 112. As discussed, AXI is provided for purposes of illustration and not limitation.

Using memory mapped interfaces 118 and 120 and control interface 122, the architecture illustrated in FIG. 1 is capable of also supporting data transfers between host system 102 and kernel circuit 112 through memory 106. For example, host system 102 sends data to memory 106. The data may be provided to DMA 110, which stores the data within memory 106 using memory controller 114. The data is accumulated and stored in memory 106 as previously described until the data transfer is complete. Host system 102 may notify kernel circuit 112 of the availability of the data in memory 106 through control interface 122. Kernel circuit 112 is capable of accessing memory controller 114 to read the data from memory 106. Kernel circuit 112 generates results and stores the results within memory 106. Kernel circuit 112 notifies host system 102 of the availability of the results in memory 106 through control interface 122.

In the examples where data is transferred to kernel circuit 112 or multiple kernel circuits implemented in IC 104 using memory 106, host system 102 has the responsibility of allocating and sharing memory 106 between the various kernel circuits. Host system 102 configures and starts kernel circuits through control interface 122. Control interface 122, however, tends to be a slower interface with significant latency. Besides having to communicate with the kernel circuits through control interface 122, host system 102 also must manage and synchronize kernel circuit operation adding significant overhead to host system 102. Host system 102, for example, must synchronize the data transfers with the control signals to start and/or stop kernel circuits at the appropriate time(s).

As discussed, in other embodiments, IC 104 includes sufficient memory resources such that memory 106 is implemented as an internal memory within IC 104. In that case, the circuit blocks described in IC 104 are capable of accessing the internal memory using interface circuitry within IC 104 and, as such, memory controller 114 may be excluded.

In one or more embodiments, architecture 100 is implemented to support direct communication between host system 102 and kernel circuit 112 by way of packetized data and data streams. In that case, memory mapped communication capability may be omitted. For example, control interface 122, memory mapped interfaces 118 and 120, and memory controller 114 may be omitted (as may be memory 106). In one or more other embodiments, however, architecture 100 is implemented to support both memory mapped communication involving memory 106 and direct communication using packetized data and data streams. For example, DMA 110 may support both types of data transfer. Further, while a single kernel circuit is illustrated in the example of FIG. 1, a plurality of kernel circuits may be implemented where some kernel circuits utilize direct communication via data streams with host system 102 while other kernel circuits utilize memory 106 for data transfers with host system 102. In still other embodiments, kernel circuits may be implemented to utilize either direct communication via data streams or memory 106 for data transfers depending upon the particular application executed by host system 102 that is invoking the kernel circuit or the particular functions invoked by the application to communicate with the kernel circuit.

Architecture 100 and other streaming architectures described herein provide a more efficient way to configure and manage kernels circuits. In particular embodiments, instructions can be provided to kernel circuits in-band with the data payload of the data streams. Including the instructions with the data, e.g., "in-banding the instructions," removes the need for control interface 122 when data streams are used and provides more efficient host system to kernel circuit communication.

Host system 102 is capable of executing a software framework that includes one or more user applications such as memory mapped user application 124 and/or stream user application 126. Memory mapped user application 124 is an application executed by host system 102 that is configured to invoke kernel circuits such as kernel circuit 112 and exchange data with kernel circuit 112 using memory mapped interfaces 118 and 120, control interface 122, and memory 106. Stream user application 126 is an application executed by host system 102 that is configured to invoke kernel circuits such as kernel circuit 112 and exchange data with kernel circuit 112 using streaming interface 116.

The software framework also includes a runtime 128. Runtime 128 provides functions, e.g., an application programming interface (API), for communicating with IC 104. For example, runtime 128 is capable of providing functions for implementing DMA transfers over PCIe. In one or more embodiments, runtime 128 is capable of providing support for streaming data between kernel circuit 112 and host system 102 using interface 116. In one or more other embodiments, runtime 128 is capable of providing support for transferring data between kernel circuit 112 and host system 102 using memory 106, memory mapped interfaces 118 and 120, and control interface 122. As an illustrative example, runtime 128 is capable of supporting execution of memory mapped user application 124 and the transfer of data with kernel circuit 112 via memory 106 and/or supporting execution of stream user application 126 and the transfer of data with kernel circuit 112 via interface 116.

Driver 130 is capable of controlling an endpoint within host system 102 (not shown). In the case of a PCIe connection, for example, the endpoint within host system 102 is implemented as a root complex. Accordingly, driver 130 is capable of implementing and managing a plurality of read and write queues for storing descriptors that control the data transfers between host system 102 and IC 104.

In one or more embodiments, driver 130 is capable of dividing a request for a large data transfer to a kernel circuit (e.g., a streamed data transfer) into multiple stream transfers of smaller chunks of data called packets. This division of data, or "packetization of data into packets", performed by driver 130 is largely hidden from kernel circuit 112. Packetization allows an interconnect fabric implemented in IC 104 to service a plurality of kernel circuits concurrently by interleaving packets destined to and/or from different kernels circuits. Driver 130 is capable of determining packet sizes to be large enough to efficiently amortize the packetization overhead while not being so large that the packets cause a kernel circuit to stall while waiting for a turn to send and/or receive streamed data while other kernel circuits are transferring streamed data.

As generally discussed, control interface 122 tends to be a slow connection that requires synchronization between the control signals conveyed and data delivered to kernel circuit 112. If, for example, control interface 122 is used for out-of-band signaling with data streams, the speed and/or synchronization requirements often lead to stopping the data stream(s) to the kernel circuit to change control signals prior to restarting the data stream(s).

As an illustrative and nonlimiting example, consider the case where kernel circuit 112 implements an encryption operation. Different data payloads provided to kernel circuit 112 typically require different keys for encryption. Were control interface 122 to be used, data streams to kernel circuit 112 would be stopped, the keys updated via control interface 112, and then the data stream(s) resumed. Such operations would be coordinated by host system 102, which adds to the overhead of host system 102. In one or more embodiments described herein, one or more instructions to kernel circuit 112 are provided in-band. As such, new and/or updated keys can be included in the data stream in-band as provided to kernel circuit 112. The instruction can be included with the payload or immediately prior to the payload. In particular embodiments, the instructions can be specified in a custom defined header for each packet. In the instant example, host system 102 is capable of sending the encryption key as part of a packet header for the plaintext payload(s) of one or more packets upon which kernel circuit 112 is to operate. As such, kernel circuit 112 is capable of operating efficiently, in this case switching encryption keys for different payloads, without host system 102 incurring synchronization overhead and with reduced latency compared to conventional techniques for data transfer as kernel circuit 112 need not be stopped and/or synchronized with control interface 122.

Figure 2:
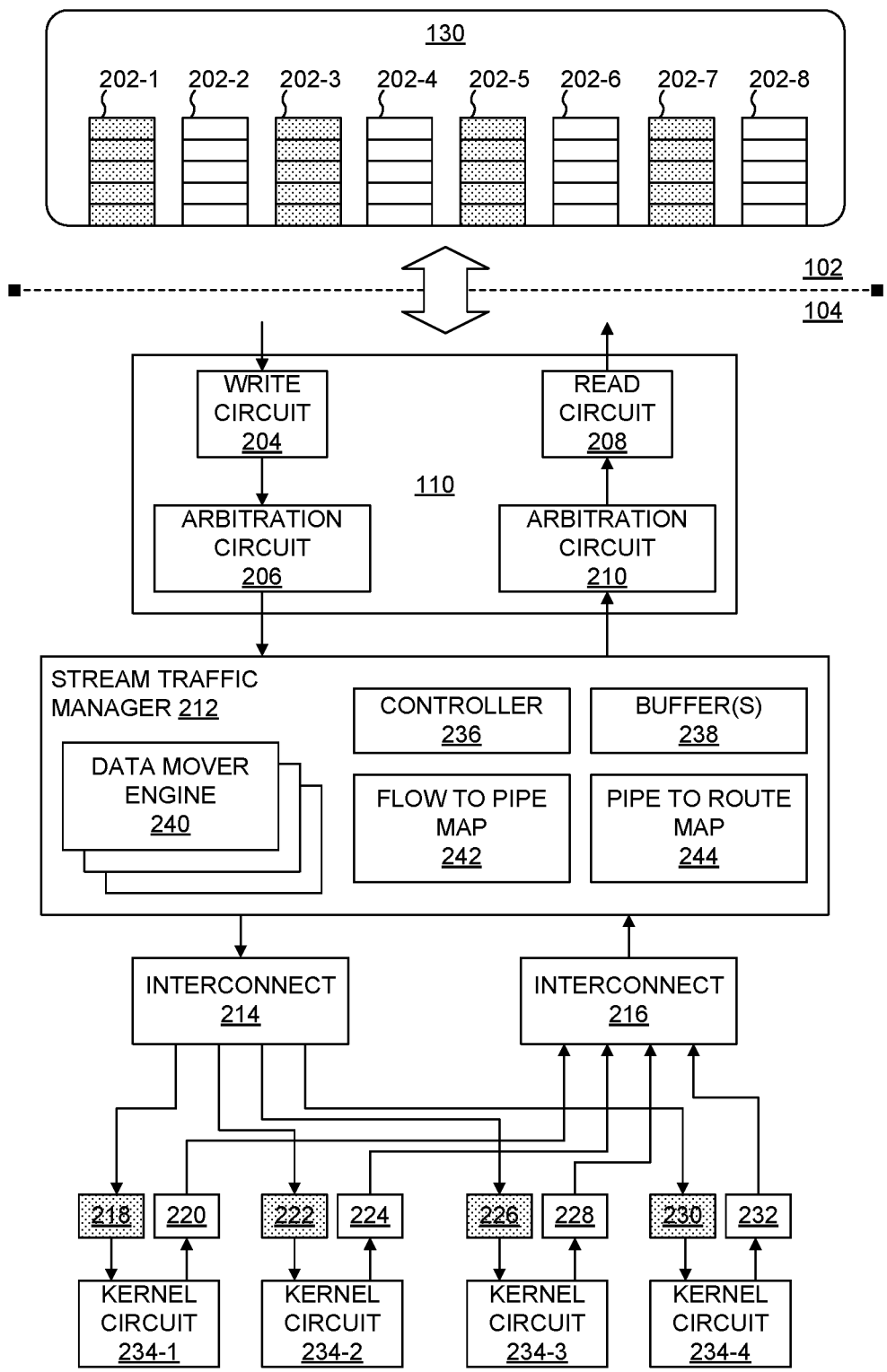
FIG. 2 illustrates another example implementation of the architecture of FIG.

FIG. 2 illustrates another example implementation of architecture 100 of FIG. 1. FIG. 2 illustrates further aspects of architecture 100 not illustrated in the higher-level view described in connection with FIG. 1. For purposes of illustration, however, some elements shown in FIG. 1 are not illustrated in FIG. 2 such as selected elements of the software framework executed by host system 102, endpoint 108 and memory controller 114 within IC 104, and memory 106.

In the example of FIG. 2, driver 130 of the software framework executed by host system 102 is shown. Driver 130 is capable of implementing a plurality of queues 202-1 through 202-8. Driver 130 is capable of creating a read queue and a write queue for each kernel circuit that is implemented within IC 104. For purposes of illustration, queues 202 configured as write queues are shaded, while queues 202 configured as read queues are not shaded. Since IC 104 implements four kernel circuits 234-1, 234-2, 234-3, and 234-4, driver 130 implements four write queues (e.g., 202-1, 202-3, 202-5, and 202-7) and four read queues (e.g., 202-2, 202-4, 202-6, and 202-8). Each of queues 202 is capable of storing one or more descriptors, where each descriptor describes a data transfer to be performed. Each descriptor stored in a write queue describes a data transfer from host system 102 to a kernel circuit 234, while each descriptor stored in a read queue describes a data transfer from a kernel circuit 234 to host system 102.

DMA 110, as noted, includes two channels. The write channel supports transfer of data from host system 102 to kernel circuits 234. The write channel includes a write circuit 204 and an arbitration circuit 206. Write circuit 204 is capable of storing commands and/or data received from host system 102 prior to forwarding the commands and/or data to kernel circuits 234. The read channel supports transfer of data from the kernel circuits 234 to host system 102. The read channel includes a read circuit 208 and an arbitration circuit 210. Read circuit 208 is capable of storing data received from kernel circuits 234 prior to forwarding the data to host system 102.

DMA 110 moves data between host memory (not shown) of host system 102 and buffers 218, 220, 222, 224, 226, 228, 230, and 232. DMA 110 fetches and maintains a list of addresses, e.g., descriptors, for every packet to be transferred, and forms the sequence of commands and addresses for endpoint 108. In one or more embodiments, DMA 110 is highly configurable. Accordingly, traffic management and flow control for DMA 110 is performed through stream traffic manager 212. Stream traffic manager 212 effectively ensures that all kernel circuits 234 have fair access to DMA 110 for data transfer to and from host system 102.

Stream traffic manager 212 is coupled to DMA 110 and to interconnects 214 and 216. Stream traffic manager 212 is capable of regulating the flow of data streams/packets between host system 102 and kernel circuits 234. In the example of FIG. 2, stream traffic manager 212 includes a controller 236, one or more buffers 238, one or more data mover engines 240, a flow to pipe map (map) 242, and a pipe to route map (map) 244.

In particular embodiments, interconnect 214 and interconnect 216 implement interface 116 of FIG. 1. In the example of FIG. 2, interconnect 214 is configured to receive packetized data from stream traffic manager 212 and route the packetized data to appropriate kernel circuits 234. Interconnect 216 is configured to receive packetized data from kernel circuits 234 and provide the packetized data to stream traffic manager 212.

In the example of FIG. 2, kernel circuits 234 are connected to interconnect 214 and interconnect 216 through buffers. Each of kernel circuits 234 has an input port configured to receive data streams through a corresponding input buffer and an output port configured to send data streams through a corresponding output buffer. For purposes of illustration, input buffers (e.g., buffers 218, 222, 226, and 230) are shaded. Output buffers (e.g., buffers 220, 224, 228, and 232) are not shaded.

Kernel circuit 234-1 is connected to interconnect 214 through buffer 218 and to interconnect 216 through buffer 220. Kernel circuit 234-2 is connected to interconnect 214 through buffer 222 and to interconnect 216 through buffer 224. Kernel circuit 234-3 is connected to interconnect 214 through buffer 226 and to interconnect 216 through buffer 228. Kernel circuit 234-4 is connected to interconnect 214 through buffer 230 and to interconnect 216 through buffer 232.

As noted, while interconnects 214 and 216 may be implemented as AXI-stream interconnects, the inventive arrangements are not intended to be so limited. Any of a variety of circuit architectures for delivering packetized data cam be used. Other example circuit architectures that may be used to implement interconnects 214 and 216 include, but are not limited to, a crossbar, a multiplexed bus, a mesh network, and/or a Network-on-Chip (NoC).

Each of input buffers 218, 222, 226, and 230 is coupled to interconnect 214 and an input port of kernel circuits 234-1, 234-2, 234-3, and 234-4, respectively. Each input buffer is capable of temporarily storing packetized data from host system 102 directed to the corresponding kernel circuit 234 in case the kernel circuit is not able to immediately absorb or process the received data. Further, each input buffer is also capable of converting packetized data received from host system 102 into a data stream that is provided to the corresponding kernel circuit 234. For example, each input buffer is capable of combining a sequence of one or more packets to generate a data stream that can be provided to the corresponding kernel circuit.

Each of output buffers 220, 224, 228, and 232 is coupled to interconnect 216 and an output port of kernel circuits 234-1, 234-2, 234-3, and 234-4, respectively. Each output buffer is capable of temporarily holding a data stream output from the corresponding kernel circuit 234, converting the data stream into packetized data, and sending the packetized data to host system 102 via interconnect 216. Each output buffer is capable of storing data in case the kernel circuit is unable to keep pace with the streaming infrastructure. Each output buffer, for example, is capable of separating the data stream output from the corresponding kernel circuit into one or more packets.

In one or more embodiments, the output buffers 220, 224, 228, and 232 are capable of providing kernel tagging information to identify the source and/or destination kernel circuits. For example, an output buffer is capable of adding the tagging information as a pre-pended header. The tagging performed by the output buffer allows data within the packets to be placed or routed to the proper place in host memory or to the appropriate kernel circuit. For example, each output buffer corresponding to a kernel circuit 234 is capable of tagging each packet with a source kernel identifier and sending the packets to interconnect 216. Interconnect 216 delivers the packets to stream traffic manager 212 and to DMA engine 110. DMA engine 110 moves the packetized data to host memory.

For purposes of illustration, kernel circuit 234-1 is described. It should be appreciated that kernel circuits 234-2, 234-3, and 234-4 may operate in the same or similar manner. In the example of FIG. 2, an input port of kernel circuit 234-1 is connected to interconnect 214 through buffer 218. An output port of kernel circuit 234-1 is connected to interconnect 216 through buffer 220. For purposes of illustration, write queue 202-1 is mapped to input buffer 218; and, read queue 202-2 is mapped to output buffer 220. In general, each of queues 202 is mapped to one of buffers 218-232. Buffers 218-232, however, may be mapped to more than one of queues 202. For purposes of illustration, queues 202-1 and 202-2 correspond to buffers 218 and 220; queues 202-3 and 202-4 correspond to buffers 222 and 224; queues 202-5 and 202-6 correspond to buffers 226 and 228; and queues 202-7 and 202-8 correspond to buffers 230 and 232.

In the example of FIG. 2, host system 102 executes a user application that is configured for data streaming. In order to establish a connection to a kernel circuit 234, host system 102 creates a pair of queues 202. As an illustrative example, the user application may invoke a function provided by runtime 128 that causes driver 130 to create a pair of queues 202-1 and 202-2 corresponding to buffers 218 and 220, respectively. Once the pair of queues 202 is created, the host processor is capable of invoking further functions to configure control registers within DMA 110 (not shown) and maps 242 and 244 of stream traffic manager 212 so that data can be streamed between host system 102 and kernel circuit 234-1, in this example.

In executing the user application, host system 102 places descriptors within queue 202-1 specifying instructions for sending (e.g., writing) data to kernel circuit 234-1 and, as appropriate, places descriptors within read queue 202-2 specifying instructions for receiving (e.g., reading) data from kernel circuit 234-1. In particular embodiments, driver 130 is capable of packetizing the data to be send to IC 104 and notifying DMA 110 of the number of descriptors available in queues 202 to be fetched. DMA 110 conveys the information to stream traffic manager 212.

Stream traffic manager 212 maintains a mapping of queues 202 to buffers 218-232 using map 242 and map 244. Using the stored mapping, stream traffic manager 212 determines that queue 202-1 corresponds to buffer 218 and that queue 202-2 corresponds to buffer 220. Controller 236, being aware of descriptors available in queue 202-1, is capable of accessing buffer 218 for the input port of kernel circuit 234-1. Controller 236 determines whether buffer 218 has space available to receive data and, if so, the amount of data that can be received and stored in buffer 218.

In one or more embodiments, DMA 110 is capable of determining how full each of queues 202 is and informing controller 236. Write circuit 204, for example, is capable of determining the number of descriptors in each of queues 202-1, 202-3, 202-5, and 202-7. Read circuit 208 is capable of determining the number of descriptors in each of queues 202-2, 202-4, 202-6, and 202-8. Read circuit 204 and write circuit 208 are capable of informing stream traffic manager 212 of the number of descriptors in the respective queues 202. Further, write circuit 204 and read circuit 208 are capable of retrieving descriptors from queues 202 under control of stream traffic manager 212.

Within stream traffic manager 212, buffer(s) 238 store descriptors retrieved from queues 202 by way of DMA 110. For example, controller 236 is capable of requesting that DMA 110 retrieve a particular number of descriptors depending upon the amount of space available within buffer(s) 238. DMA 110 provides the retrieved descriptors to stream traffic manager 212. As such, stream traffic manager 212 is capable of internally storing, within buffer(s) 238, a subset of the descriptors stored in each of queues 202.

In one or more embodiments, the format or syntax of the descriptors indicates how many descriptors are needed to form a packet and the number of bytes in the packet. Controller 236, in response to determining that buffer 218 has space available to receive data, evaluates the descriptors stored within buffer(s) 238 corresponding to kernel circuit 234-1 (e.g., where the descriptors were retrieved from queue 202-1) and determines, based upon the data within the descriptor(s) themselves, the number of descriptors to execute to retrieve a sufficient amount of data (e.g., packet(s)) to store in buffer 218 and not overrun the available space of buffer 218.

In one or more embodiments, each of data mover engines 240 is capable of retrieving data from host system 102 and sending data to host system 102 via DMA 110. Data mover engines 240 are capable of operating concurrently. Controller 236 is capable of assigning descriptors to be executed from buffer(s) 238 to available ones of data mover engines 240. Each data mover engine 240 processes the assigned descriptors by fetching the data specified by each of the respective descriptors. For example, a data mover engine 240 is capable of sending retrieved packetized data specified by the descriptor(s) to buffer 218 via interconnect 214. As noted, input buffer 218 is capable of storing the packetized data, converting the packetized data into a data stream, and providing the data stream to kernel circuit 234-1.

The packet handling abilities of the stream traffic manager 212 allow packets that may correspond to different data streams to be retrieved in an interleaved manner. Packets can be retrieved from host system 102 (or sent to host system 102) in an interleaved manner for N different data streams.

Stream traffic manager 212 is capable of performing the operations described for each of kernel circuits 234. As such, stream traffic manager 212 is capable of continually monitoring the input buffer for each kernel circuit 234 and initiating a data transfer to the buffer only in response to first determining that the input buffer has space to receive and store the data. In other words, controller 236 is capable of continually determining which descriptors in queues 202 have corresponding buffers in IC 104 that have sufficient space available and then executing such descriptors.

At any given time, the communication bus connecting IC 104 and host system 102 is capable of simultaneously carrying multiple descriptors and/or data being fetched. Each of interconnects 214 and 216 is capable of conveying a single packet at a time. In particular embodiments, arbitration circuit 206 is capable of implementing a round-robin arbitration scheme to pass one packet at a time corresponding to different kernel circuits. In other embodiments, arbitration circuit 206 may use a different arbitration scheme. Because stream traffic manager 212 only executes descriptors (initiates read requests) for those kernel circuits 234 having available space in the input buffer, the packet received from stream arbitration 206 is passed on to the intended input buffer of the target kernel circuit 234 and is guaranteed not to have any back-pressure. Space for receiving the packetized data is guaranteed since space in the input buffer was pre-allocated.

Stream traffic manager 212 is further capable of instructing DMA 110 to fetch data in an interleaved manner. As an illustrative example, controller 236 requests DMA 110 to retrieve one or more packets for kernel circuit 234-1, then one or more packets for kernel circuit 234-2, and so on based upon which kernel circuits are busy and available space in the input buffers. Stream traffic manager 212 performs arbitration among kernel circuits 234 knowing how busy each of kernel circuits 234 is and how much data storage is available within each respective input buffer of each kernel circuit 234. In particular embodiments, controller 236 stores the first "N" descriptors for each of the write queues 202 locally in buffer(s) 238 and performs a round-robin arbitration scheme checking each input buffer of each kernel circuit for available space.

Architecture 100 is capable of operating in a similar manner when transferring data from kernel circuits 234 to host system 102. For example, stream traffic manager 212 is capable of storing the first "N" descriptors of each of the read queues 202-2, 202-4, 202-6, and 202-8. Stream traffic manager 212 is capable of determining when result data is available in output queues for kernel circuits 234. In response to determining that a descriptor is available corresponding to an output buffer that is contains a stored result, controller 236 initiates a data transfer from the output buffer to host system 102 using an available data mover engine 240. Availability of the descriptor indicates that host system 102 has available space for receiving the results from the kernel circuit.

For purposes of illustration, kernel circuit 234-1 is capable of operating on data from input buffer 218. Kernel circuit 234-1 outputs result data to output buffer 220 as a data stream. Stream traffic manager 212, e.g., controller 236, is capable of monitoring the output buffers to determine when data is available, e.g., at least a complete packet of data is available in an output buffer and the corresponding read queue has sufficient space available to store the data (e.g., the at least a complete packet). In response to determining that output buffer 220 has data available and determining that a descriptor is available in the corresponding read queue 202-2 (which may be retrieved and cached in a buffer 238 in stream traffic manager 212), controller 236 initiates a data transfer from output buffer 220 through interconnect 216 to DMA 110 and to host system 102. Output buffer 216 converts the data stream to packetized data before sending the data to interconnect 216 and on to host system 102. In one or more embodiments, arbitration 210 is capable of implementing round-robin arbitration. In other embodiments, arbitration 210 is capable of implementing other arbitration techniques. The arbitration techniques, whether round-robin or otherwise, implement interleaving or rotation of data streams and/or packets from kernel circuits 234.

In embodiments where multiple streaming enabled kernel circuits are implemented within an IC, each active kernel circuit receives a portion of the IC's data transfer bandwidth. Concurrent operation of multiple streaming enabled kernel circuits typically means that such kernel circuits are designed to operate on fragments of data as the data fragments arrive at each respective kernel circuit, rather than operating on the entire completed data transfer before computing commences. This ability to operate on smaller fragments of data gives streaming enabled kernel circuits as described herein quicker access to data, which facilitates lower latency, higher performance, lower data storage requirements, lower overall cost, and lower power consumption.

When interleaving (or rotating) among different kernel circuits sending data to and/or receiving data from DMA 110, stream traffic manager 212 is capable of ensuring that the interconnect fabric, e.g., interconnects 214, 216, are not blocked by a slow kernel circuit. This is accomplished, at least in part, by using buffers 218-232. In one embodiment, each of buffers 218-232 is sized to store at least one complete packet of data. As discussed, data directed to kernel circuits is not sent unless buffer space is available in the input buffer of the kernel circuit. Once a burst of a packet has arrived at the input buffer, the kernel circuit is capable of emptying the buffer on the kernel circuit's own time table without negatively affecting traffic on interconnect 214 thereby preventing a congestion condition known as "head-of-line blocking." Similarly, data directed to host system 102 from kernel circuits is not sent from the kernel circuits across interconnect 216 until a full packet has been transferred to the output buffer.

The output buffers of kernel circuits have exclusive use of interconnect 216 once a data transfer commences. If a kernel circuit falls behind or stops sending data in the middle of a packet, interconnect 216 cannot switch to servicing another kernel circuit until interconnect 216 has received the entire packet, thereby locking interconnect 216 and preventing other kernel circuits from sending data to the host system. Were the output buffers to be omitted, one kernel circuit could adversely impact the performance of other kernel circuits. In accordance with the inventive arrangements described herein, each output buffer is capable of receiving and storing a minimum of an entire packet before attempting to send the data to interconnect 216. This feature ensures that once transmission of a packet commences, the transmission will complete as quickly as interconnect 216 and the upstream infrastructure can absorb the transfer irrespective of kernel circuit behavior or kernel circuit output data rate.

In one or more embodiments, the kernel circuits and buffers are implemented using programmable circuitry. As such, the buffers are only created for kernel circuits that are actually implemented in IC 104. Circuit resources of IC 104 are not wasted on input and/or output buffers when a small number of kernel circuits are deployed. Resource usage scales with the number of kernel circuits implemented in IC 104. In particular embodiments, data transfer across interconnects 214, 216 is regulated through a system of buffer credits managed by stream traffic manager 212.

In one or more embodiments, runtime 128 is capable of providing a variety of application programming interfaces (APIs) that may be invoked by the user applications to support communication directly with kernel circuits using data streams. The following is a list of example APIs provided by runtime 128.

clCreateHostPipe—An OpenCL API that creates a read or write type data buffer for streaming data also referred to as a "streaming pipe".
  clEnqueueWritePipeBuffer—Queues packets directly to a streaming pipe for writes (data transfer to kernel circuit).
  clEnqueueReadPipeBuffer—Queues packets directly to a streaming pipe for reads (data transfer from kernel circuit).

Runtime 128 further may provide APIs for creating, destroying, starting, stopping, and modifying read and/or write queue pairs:
  struct xclQueueContext
  xclCreateWriteQueue—Creates a write queue in the host system. Allocates resources in the host system and initializes the write queue for DMA 110 to issue device requests. A queue handle for the created write queue is returned for future access.
  xclCreateReadQueue—Creates a read queue in the host system. Allocates resources in the host system and initialize a read queue for DMA 110 to issue "from device" requests. A queue handle for the created read queue is returned for future access.
  xclDestroyQueue—Destroys specified read/write queue and reclaims the resources that were used to implement the destroyed read/write queue.
  xclModifyQueue—Modifies parameters of the specified read/write queue.
  xclStartQueue—Brings the specified read/write queue to a running state where the queue is able to start accepting and processing DMA requests.
  xclStopQueue—Brings the specified read/write queue to an initialized state. All pending DMA requests are flushed.

Runtime 128 further may provide APIs for issuing writes to kernel circuits and reads from kernel circuits such as:
  struct xclQueueRequest
  struct xclWRBuffer
  xclWriteQueue—Writes to the specified queue.
  xclReadQueue—Reads from the specified queue.

Driver 130 further may provide APIs supporting operation of DMA 110 such as:
  streamq_create( )
  streamq_destroy( )
  streamq_write( )/streamq_read In one or more embodiments, runtime 128 provides input/output control (IOCTL) system calls for input/output operations relating to IC 104 that can be invoked to create, destroy, start, stop, and modify read and/or write requests. In particular embodiments, these system calls are not available to user space applications executing in host system 102. Runtime 128 further may provide Portable Operating System Interface (POSIX) read/write functions and asynchronous I/O (AIO) read/write functions that are available to user space applications executed within host system 102.

A system executing an electronic design automation (EDA) application that includes a hardware compiler/system linker is capable of mapping kernel arguments to queues during a design flow (e.g., high-level synthesis, synthesis, placement, routing, and/or configuration bitstream generation) implementing the kernel. The mapping information is generated and stored with the configuration bitstream (e.g., a partial configuration bitstream) specifying the kernel circuit within a container file. The container file is stored in host system 102 for use and implementation within IC 104.

When host system 102 retrieves the container file to implement the configuration bitstream from the container file with IC 104, host system 102 further is capable of extracting the metadata including the mapping information generated during compilation. The mapping information is provided to runtime 128 for use in setting up communication paths to route data streams between host system 102 and the kernel circuit once implemented within IC 104.

The EDA application is capable of generating a kernel circuit (e.g., a configuration bitstream specifying the kernel circuit) configured to use data streams in lieu of memory mapped transactions involving either off-chip RAM or internal RAM for data transfers based upon the usage of the "pipe" data constructs within the program code for the kernel. For example, in response to detecting the pipe data structures, the EDA application is capable of generating the necessary hardware infrastructure and/or circuitry supporting data transfers using data streams as described in connection with FIGS. 1 and/or 2. An example of a kernel specified in OpenCL is provided below as Example 1.

Example 1

```
__kernel void (pipe p1, pipe p2) {
    <gentype> data; //This "gentype" can map to AXI width of, e.g., 512 bytes.
    While (read_pipe(p1, &data) != t_last_bool( ))
    {
        Write_pipe(p2, data); //"false" is the boolean suggested
    }
    Write_pipe(p2, "t_last"); //write out the t_last
```

When compiling the above example kernel, the EDA application generates mapping information for p1 and p2. The mapping information includes register settings for configuring stream traffic manager 212 (e.g., by storing such settings in maps 242 and 244) and DMA 110 (by storing in control registers therein) to properly route data streams between the host system 102 and a particular kernel circuit such as kernel circuit 234-1 once implemented within IC 104. In one example, the mapping information specifies the particular route_id and flow_id to which each pipe is bound and/or static information relating to pipe p1 and pipe p2. This mapping data is stored as metadata within the container file for the configuration bitstream specifying the kernel circuit generated from the kernel (e.g., program code).

For example, to send data from the memory of host system 102 to kernel circuit 234-1, runtime 128 and/or driver 130 assigns the operation to p1 and binds p1 to queue structure 202-1. Host system 102 looks up a route_id for kernel circuit 234-1 from internal tables. The route_id specifies the location of kernel circuit 234-1. Host system 102 configures the control registers of DMA 110 with pipe p1 and the associated queue 202-1. Host system 102 creates an entry correlating the route_id for kernel circuit 234-1 with queue 202-1 and pipe p1. In one or more embodiments, stream traffic manager 212, in response to receiving data corresponding to pipe p1, is capable of tagging kernel circuit bound data belonging to p1 with the correct route_id. Given data tagged with this route_id, stream traffic manager 212 and interconnect 214 are able to deliver data to kernel circuit 234-1 via buffer 218.

Similarly, to transfer data from kernel circuit 234-1 to the memory within host system 102, runtime 128 and/or driver 130 are capable of assigning that operation to p2 and binding p2 to queue 202-1. Host system 102 looks up the flow_id that is used to tag host bound data from kernel circuit 234-1. In one or more embodiments, kernel circuit 234-1 is capable of tagging outbound data with the appropriate flow_id. In one or more other embodiments, buffer 220 includes circuitry that is capable of tagging the outbound data with the appropriate flow_id. Host system 102 configures DMA 110 with pipe p2 and associates pipe p2 with queue 202-2. Host system 102 further creates an entry correlating the flow_id for kernel circuit 234-1 (e.g., buffer 220) with queue 202-2 and pipe p2 for the data transfer. Stream traffic manager 212 is further capable of binding host-bound traffic tagged with the flow_id to pipe p2 when forwarding that data to DMA 110.

Once both DMA 110 and stream traffic manager 212 are configured for data transfer, DMA 110 is commanded to begin operation according to Example 1 above.

Figure 3:
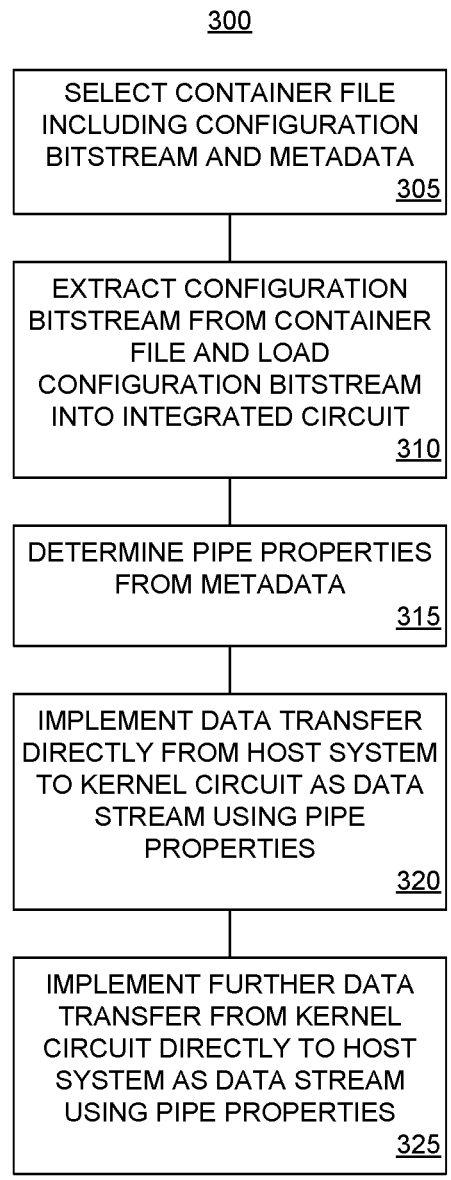
FIG. 3 illustrates an example method of transferring data between a host system and kernel circuits of a hardware accelerator using data streams.

FIG. 3 illustrates an example method 300 of transferring data between a host system and kernel circuits of a hardware accelerator using data streams. Method 300 can begin in a state where the host system stores one or more container files within memory. Each container file includes one or more configuration bitstreams and corresponding metadata. Each of the configuration bitstreams, which may be partial configuration bitstreams, specifies one or more kernel circuits.

In block 305, the host system selects a container file. For purposes of illustration, the container file includes a configuration bitstream and metadata for the configuration bitstream. The configuration bitstream may be a partial configuration bitstream. In one or more embodiments, the host system selects the container file in response to the user application requesting hardware accelerated functionality implemented by kernel circuits specified by the configuration bitstream in the container file. The user application may specify the particular container file to be selected or retrieved from memory and implemented in the hardware accelerator.

In block 310, the host system extracts the configuration bitstream from the container file. The host system loads the configuration bitstream into an IC, e.g., IC 104, of the hardware accelerator. By loading the configuration bitstream into the IC of the hardware accelerator, the kernel circuitry specified by the configuration bitstream is physically implemented within the IC and available to perform tasks requested by the host system.

In block 315, the host system determines one or more pipe properties from the metadata. For example, the host system extracts metadata for the configuration bitstream from the selected container file. The metadata includes mapping information generated when the kernels were compiled. The mapping data includes one or more pipe properties that may be used to configure DMA 110 and stream traffic manager 212. For example, the pipe properties may include settings, e.g., register settings, such as a route_id and/or a flow_id that may be loaded into the DMA 110 and/or the stream traffic manager to establish routes for exchanging data between the host system and the kernel circuit or circuits implemented by the configuration bitstream extracted from the selected container file.

In one or more embodiments, the metadata for the configuration bitstream includes additional information generated during the design flow that allows the stream traffic manager to operate more efficiently. For example, the metadata can specify information, e.g., settings, that are specific to each kernel. As such, using the metadata, the stream traffic manager is capable of adjusting how data is streamed to the kernel circuits and/or streamed from the kernel circuits to the host system on a per-kernel circuit basis. The metadata, for example, can specify the size of the kernel circuit's working data set (which corresponds to packet size), the compute time required for the kernel circuit per data set, the amount of prefetching desired for the kernel circuit, and the like. The stream traffic manager can adjust the amount of data retrieved for the kernels and the amount of prefetching in accordance with the metadata for that particular kernel circuit during operation.

As part of block 315, the host system is capable of sending the settings (e.g., pipe properties and/or other information as described) to the stream traffic manager and/or the DMA to configure the data path for streaming data between the implemented kernel circuit and the host system. For example, the host system invokes a function or functions available in the driver and/or the runtime to configure the data path. The function, for example, writes the settings to the control registers of the DMA and the maps of the stream traffic manager. The stream traffic manager may include additional control registers that may be written with the settings described herein.

In block 320, the host system implements a data transfer directly from the host system to a kernel circuit as a data stream using the settings. For example, the host system adds one or more descriptors to the write queue within the driver that corresponds to the input buffer of the target kernel circuit. The DMA is capable of retrieving one or more of the descriptors and providing the retrieved descriptors to the stream traffic manager. The stream traffic manager stores the descriptors temporarily within internal buffers. As discussed, the stream traffic manager is capable of monitoring the state of the input buffer for the target kernel circuit and when space is available within the input buffer, execute one or more of the descriptors corresponding to the input buffer of the target kernel circuit using an available data mover engine contained therein. As such, DMA 110 retrieves data from host memory in packetized form. Stream traffic manager streams the data to the input buffer of the target kernel circuit. As noted, the input buffer is capable of converting the packetized data into streamed data.

In one or more embodiments, the data that is transferred to the target kernel circuit includes one or more instructions embedded therein for the kernel circuit. In this regard, the commands are said to be "in-band" with or relative to the data. By including instructions for the kernel circuit within the data stream, separate signaling for the kernel circuit need not be provided to start and/or stop operation of the kernel circuit. Such operations may be initiated by the in-band instructions included in the data stream(s). In particular embodiments, the kernel circuits and/or the host system are capable of exchanging continuous data streams or optionally data streams interspersed with instructions (e.g., command or status information).

In one or more embodiments, the host system is capable of determining that the data transfer is to be implemented as a data stream based on a data type used by the user application requesting the data transfer and/or the particular API invoked by the user application.

In block 325, the host system implements a further data transfer from the kernel circuit directly to the host system as a data stream using the pipe properties. For example, the host system adds one or more descriptors to the read queue of the driver that corresponds to the output buffer of the target kernel circuit. As noted, the DMA is capable of retrieving one or more of the descriptors and providing the retrieved descriptors to the stream traffic manager. The stream traffic manager stores the descriptors temporarily within internal buffers. The stream traffic manager is capable of monitoring the state of the output buffer for the kernel circuit and when a data stream is available within the output buffer, execute one or more of the descriptors corresponding to the output buffer of the target kernel circuit using an available data mover engine contained therein. As such, the data mover engine of the stream traffic manager retrieves packetized data from the output buffer of the target kernel circuit and provides the packetized data to the DMA. As noted, the output buffer converts the data stream to packetized data. The DMA provides the packetized data to the host memory over the communication bus.

Figure 4:
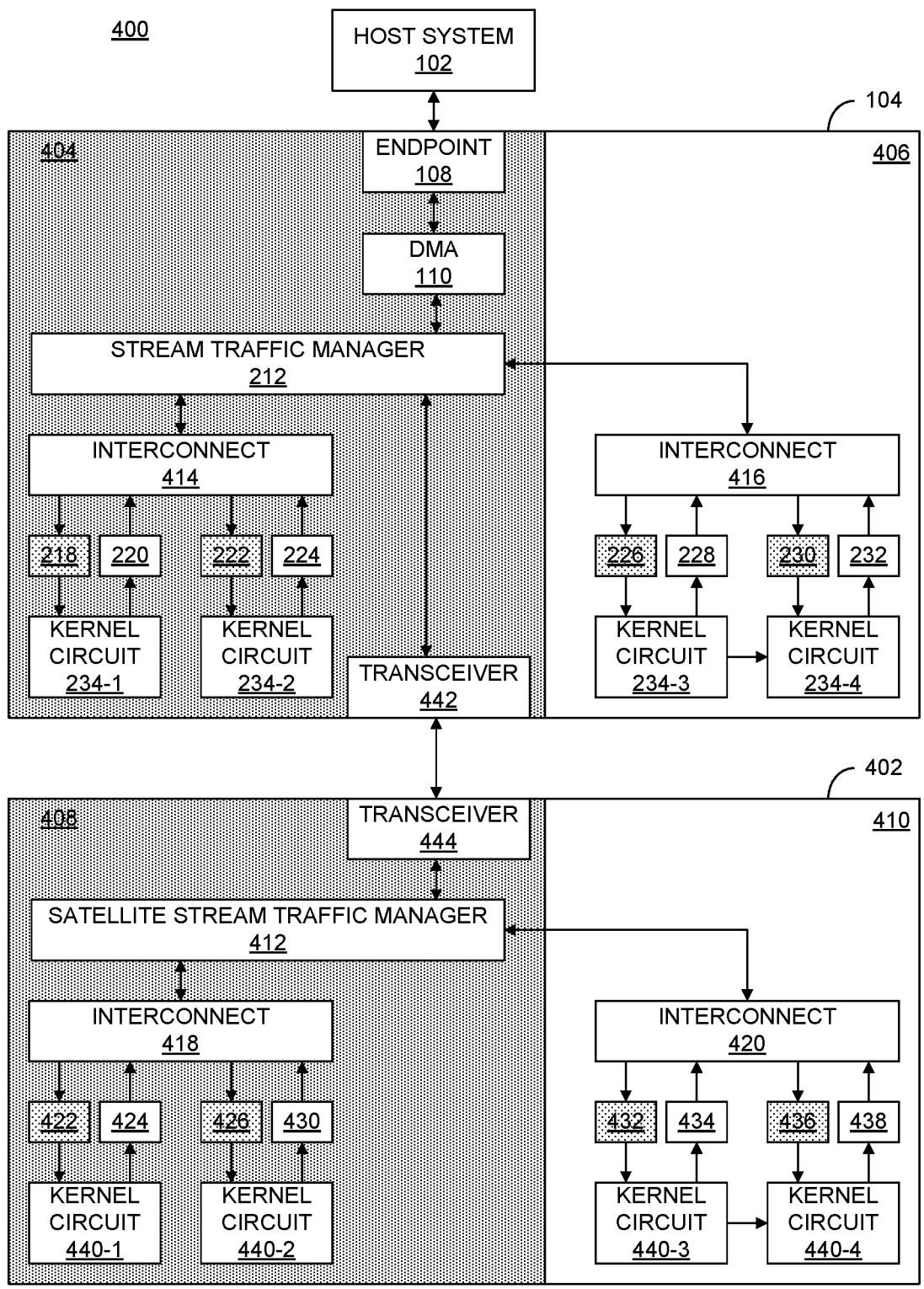
FIG. 4 illustrates example architecture for exchanging data between kernel circuits using data streams.

FIG. 4 illustrates an example architecture 400 for exchanging data between kernel circuits using data streams. Architecture 400 supports use cases where applications require a plurality of large and complex kernel circuits and additional ICs are used to augment the programmable circuitry provided by a primary IC. The primary IC is configured to support communication with the host system via an endpoint and a DMA. The primary IC also includes a stream traffic manager. In one or more embodiments, the stream traffic manager is capable of routing packetized data for kernel circuits to one of several different ports, each connected to an independent interconnect. Partitioning kernel circuits to different interconnects allows the kernel circuits to be located in different physical regions of an IC, e.g., different dies in the case of a multi-die IC. Further, the different interconnects isolate kernel circuits of different regions from interfering with one another. This partitioning allows multi-die ICs to be used and also secondary ICs to be used.

Architecture 400 includes IC 104 and an IC 402. In one or more embodiments, ICs 104 and 402 are coupled to a same circuit board, e.g., a hardware accelerator, that may also include RAM (not shown). In the example of FIG. 4, each of ICs 104 and 402 is implemented as a multi-die IC. IC 104 includes dies 404 and 406. IC 402 includes dies 408 and 410. Each of dies 404, 406, 408, and 410 is implemented to include programmable circuitry as described in greater detail herein in connection with FIG. 7. In particular embodiments, one or more of dies 404, 406, 408, and 410 includes one or more hardwired circuit blocks. In one example, each of dies 404, 406, 408, and 410 is implemented as a field programmable gate array (FPGA).

In the example of FIG. 4, dies 404 and 406 are included within a same package, while dies 408 and 410 are included in a different package. IC 104 and IC 402 can be implemented using any of a variety of available multi-die technologies. In one or more embodiments, dies 404 and 406 are mounted on an interposer that includes wires capable of conveying signals between dies 404 and 406. Similarly, dies 408 and 410 are mounted on an interposer that includes wires capable of conveying signals between dies 408 and 410. The dies may be mounted using a plurality of solder bumps or another connection technology. The interposer includes a plurality of through vias that allow selected signals to pass external to the multi-die IC package to a substrate, for example.

For purposes of illustration, dies 404 and 408 are shaded to better illustrate the different circuit blocks included in each respective die. In the example of FIG. 4, dies 404 and 408 include additional circuit blocks not included in dies 406 and 410, respectively. For example, die 404 includes endpoint 108, DMA 110, stream traffic manager 212, and transceiver 442, whereas die 406 does not. In one or more embodiments, one or more of endpoint 108, DMA 110, and/or transceiver 442 are implemented as hardwired circuit blocks. In particular embodiments, endpoint 108, DMA 110, and/or transceiver 442 are implemented in programmable circuitry. These circuit structures are not repeated within die 406. Similarly, die 408 includes transceiver 444 and satellite stream traffic manager 412, whereas die 410 does not. These structures are not repeated in die 410.

In the example of FIG. 4, endpoint 108, DMA 110, and stream traffic manager 212 are implemented substantially as described in connection with FIGS. 1 and 2. In the example of FIG. 4, however, stream traffic manager 212 includes additional I/O ports. For example, stream traffic manager 212 includes additional I/O ports that connect to transceiver 442. Further, one or more I/O ports of stream traffic manager 212 couple to die 406 and, in particular, to interconnect 416. In one or more embodiments, interconnect 414 and interconnect 416 each represent an instance of interconnect 214 and an instance of interconnect 216. As such, each of dies 404 and 406 includes an instance of interconnect 214 and interconnect 216. As illustrated, kernel circuits 234 and the corresponding buffers are spread across dies 404 and 406.

Die 408 includes a transceiver 444, satellite stream traffic manager 412, interconnect 418, buffers 422, 424, 426, and 428, and kernel circuits 440-1 and 440-2. In particular embodiments, interconnect 418 represents another instance of interconnect 214 and another instance of interconnect 216. Die 410 includes interconnect 420, buffers 432, 434, 436, and 438, and kernel circuits 440-3 and 440-4. Similarly, interconnect 420 represents another instance of interconnect 214 and another instance of interconnect 216. In one or more embodiments, transceiver 444 is implemented as hardwired circuit block. In particular embodiments, transceiver 444 is implemented in programmable circuitry.

In the example of FIG. 4, IC 104 is capable of operating as a master in that die 404 includes endpoint 108 to communicate with host system 102. Further, stream traffic manager 212 is capable of communicating with satellite stream traffic manager 412 by way of transceivers 442 and 444. In one or more embodiments, transceivers 442 and 444 implement a high speed, point-to-point interconnect that includes a plurality of serial data lanes. The connection formed by transceivers 442 and 444 exchanges data between stream traffic manager 212 and satellite stream traffic manager 412. Further, Transceivers 442 and 444 are capable of providing an additional layer of buffering to hide additional latency from crossing an IC boundary. In the example of FIG. 4, stream traffic manager 212 and satellite stream traffic manager 412 send and receive packetized data. In one or more embodiments, transceivers 442 and 444 are capable of serializing streaming packets exchanged between stream traffic manager 212 and satellite stream traffic manager 412 for purposes of transmitting from one transceiver to the other and deserializing the transmitted data for sending and/or handling within ICs 104 and 402. Similarly, transceivers 442 and 444 are capable of serializing credit messages exchanged between the stream traffic manager 212 and satellite stream traffic manager 412 for purposes of transmitting from one transceiver to the other and deserializing such messages for sending and/or handling within IC 104 and/or IC 402.

Using architecture 400, host system 102 is capable of configuring DMA 110, stream traffic manager 212, and satellite stream traffic manager 412 to route packetized data. For example, stream traffic manager 212 is capable of passing any necessary mapping data and/or settings on to satellite stream traffic manager 412. Once configured, host system 102 is capable of offloading tasks to IC 104 and/or IC 402. Further, host system 102 is capable of directing tasks to one or more of kernel circuits 234 and/or one or more of kernel circuits 440.

Whereas kernel circuits 234 were included in a single die in the example of FIG. 2, in the example of FIG. 4 kernel circuits 234 are distributed across dies 404 and 406. Similarly, kernel circuits 440 are distributed across dies 408 and 410. While stream traffic manager 212 allows data to be provided to multiple kernel circuits concurrently, stream traffic manager 212 is also capable of establishing connections between kernel circuits 234 (e.g., 234-1 to 234-2 or vice versa; 234-1 or 234-2 to 234-3 or 234-4; 234-3 to 234-4 or vice versa; 234-3 or 234-4 to 234-2 or 234-1). For example, in cases where kernel circuits are not initially configured to communicate directly with one another, stream traffic manager 212 is capable of allowing a kernel circuit to stream data to another kernel circuit, whether in the same die or a different die of the same IC. Similarly, satellite stream traffic manager 418 is capable of allowing a kernel circuit to stream data to another kernel circuit, whether in the same die or a different die of the same IC (e.g., 440-1 or 440-2 to 440-3 or 440-4; 440-1 to 440-2 or vice versa; 440-3 to 440-4 or vice versa; 440-3 or 440-4 to 440-1 or 440-2). Data exchanged between kernel circuits located in different dies and/or in different ICs is controlled by stream traffic manager 212 and/or satellite stream traffic manager 412, as the case may be, and must flow through stream traffic manager 212 and/or satellite stream traffic manager 412.

In another embodiment, when data is exchanged between kernel circuits located in a same die, the data may flow from a sending kernel circuit to an interconnect and from the interconnect to the receiving kernel circuit bypassing, but under control of, stream traffic manager 212 and/or satellite stream traffic manager 412 as the case may be. In either case, the output buffer of the sending kernel circuit converts the data stream output from the sending kernel circuit into packetized data, while the input buffer of the receiving kernel circuit converts the packetized data into a data stream for consumption by the receiving kernel circuit.

Stream traffic manager 212 is also capable of communicating with satellite stream traffic manager 412. Satellite stream traffic manager 412 is implemented substantially similar to stream traffic manager 212. Communication between stream traffic manager 212 and satellite stream traffic manager 412 via transceivers 442 and 444 allows a kernel circuit in one IC to stream data to a kernel circuit in a different IC (e.g., 234-1 or 234-2 to 440-1 or 440-2; 234-1 or 234-2 to 440-3 or 440-4; 234-3 or 234-4 to 440-1 or 440-2; 234-3 or 234-4 to 440-3 or 440-4; 440-1 or 440-2 to 234-1 or 234-2; 440-1 or 440-2 to 234-3 or 234-4; 440-3 or 440-4 to 234-1 or 234-2; 440-3 or 440-4 to 234-3 or 234-4).

Notwithstanding, kernel circuits can be implemented to communicate directly with one another. In that case, the kernel circuits are created and implemented within programmable circuitry with this capability built in. Such connections are illustrated in FIG. 4 where kernel circuit 234-3 is capable of communicating directly with kernel 234-4 to provide data results thereto without using stream traffic manager 212. In cases where kernel circuits are located in different dies and/or in different ICs, stream traffic manager 212 and/or satellite stream traffic manager 412 is needed.

In many cases, kernel circuits (e.g., the operations performed by such kernel circuits) are chained together in series. Data may be passed from one kernel circuit to another in steps where each different kernel circuit is customized to perform a different operation. In other implementations that use memory mapped interfaces, whether the memory is local within the IC or external to the IC, the progress of the upstream kernel circuit(s) must be tracked by the host system in order to start downstream kernel circuit(s) in a timely manner, e.g., when operation of upstream kernel circuit(s) is detected. In some cases, the host system must also copy data from the upstream kernel circuit to the downstream kernel if the downstream kernel circuit does not have access to the same memory as the upstream kernel circuit. This type of architecture results in significant overhead in the software within host system 102 and often results in under-utilization of the hardware (kernel circuits).

The streaming architecture described within this disclosure, which uses in-band instructions within the data streams passed from kernel circuit to kernel circuit, allows one kernel circuit to pass data directly to another kernel circuit with the instruction included in the data stream thereby implementing the chained processing of data through multiple kernel circuits without involvement of host system 102. The streaming architecture reduces the overhead imposed on the host system and makes more efficient use of the hardware resources.

It should be appreciated that the stream traffic manager circuitry is capable of providing data from host system 102 to any of the kernel circuits implemented in IC 102 or IC 402. Packetized data from host system 102 provided to kernel circuits in IC 104 pass through endpoint 108, DMA 110, and stream traffic manager 212. Data streams output from kernel circuits in IC 104 (e.g., result data streams) pass to host system 102 via stream traffic manager 212, DMA 110, and endpoint 108. Packetized data from host system 102 provided to kernel circuits in IC 402 pass through endpoint 108, DMA 110, stream traffic manager 212, transceivers 442 and 444, and satellite stream traffic manager 412. Data streams output from kernel circuits in IC 402 (e.g., result data streams) pass through satellite stream traffic manager 412, transceivers 444 and 442, stream traffic manager 212, DMA 110, and endpoint 108. In sending and/or receiving packetized data to kernel circuits in IC 402, host system 102 may operate substantially as described in connection with FIG. 2, where input driver 130 generates a read and a write queue for each kernel circuit, whether implemented in IC 102 or IC 402.

The architectures illustrated in FIGS. 1, 2, and 4 allow upstream kernel circuits to stream data to any available downstream kernel circuit without requiring more complex interconnect circuitry that supports direct connections between each possible pair of kernel circuits. The architectures of FIGS. 1, 2, and 4 implement this capability by having the upstream kernel circuit output data to the stream traffic manager circuitry (for purposes of description, "stream traffic manager circuitry" refers to the stream traffic manager, the satellite stream traffic manager, or both operating in a coordinated manner). The stream traffic manager circuitry routes the data to the downstream kernel. Since the data is regulated by the stream traffic manager circuitry using credits, large store and forward buffers are not required. Further, host system 102 is not involved in the data transfer. As an illustrative and nonlimiting example, an upstream kernel circuit, e.g., a sending kernel circuit, performs compression while a downstream kernel circuit performs encryption. The upstream kernel circuit sends the resulting compressed data to the stream traffic manager circuitry, which routes the data, which has been packetized by the output buffer of the sending kernel circuit, to the downstream kernel circuit, e.g., the receiving kernel circuit. The input buffer of the receiving kernel circuit converts the packetized data into a data stream. The downstream kernel circuit may provide the resulting encrypted data back to the stream traffic manager circuitry, which may then route the encrypted data to yet another kernel circuit or provide the encrypted data to host system 102.

The streaming architectures described within this disclosure also allow place and route functions of the EDA application (as executed by a data processing system) to operate more efficiently (requiring less time to complete) since the place and route tools do not have to consider the relative placement of the upstream and downstream kernel circuits. This is especially important when two or more kernel circuits that exchange data by way of data streams are located in different dies and/or different ICs.

Without the example streaming architectures described within this disclosure, direct kernel-to-kernel routing would need to be implemented among each pair of kernel circuits intended to communicate. This type of connectivity places significant restrictions on the placement and routing of kernel circuits to meet timing requirements and becomes even more difficult when crossing die and/or IC boundaries. Further, using the architectures described herein provides the flexibility described while also achieving greater clock speeds for the implemented kernel circuits. An architecture that uses point-to-point connections between each possible pair of kernel circuits would require so many resources of the programmable circuitry that the resulting implementation would operate at a slower clock frequency than is attainable using the example streaming architectures described herein.

In the example of FIG. 4, IC 104 and IC 402 both are implemented as multi-die ICs. In one or more other embodiments, one or both of ICs 104 and 402 are implemented as single die ICs that include transceivers.

Figure 5:
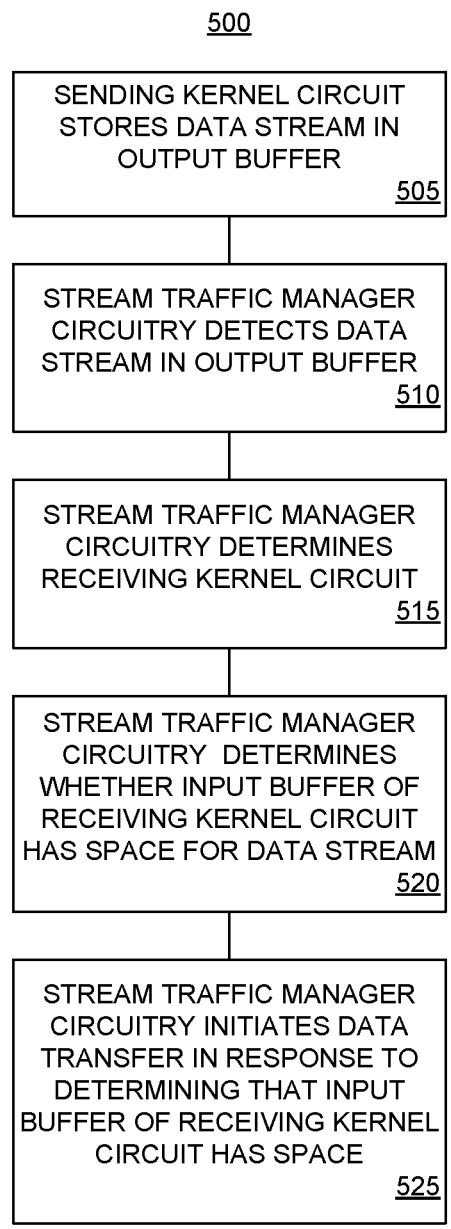
FIG. 5 illustrates an example method of exchanging data between kernel circuits using data streams.

FIG. 5 illustrates an example method 500 of exchanging data between kernel circuits using data streams. Method 500 can begin in a state where the host system has offloaded a task to a kernel circuit within the hardware accelerator. In one or more embodiments, method 500 begins in a state after performing blocks 305-320 of FIG. 3 and/or for each IC involved in a data transfer. In the example of FIG. 5, the kernel circuit, referred to herein as the sending kernel circuit, performs one operation in a chain of operations, where each operation is performed by a different kernel circuit.

In block 505, the sending kernel circuit outputs, or stores, a data streaming the output buffer attached to the output port. In block 510, the stream traffic manager circuitry detects the data stream stored in the output buffer of the sending kernel circuit. The stream traffic manager circuitry is capable of monitoring the status of buffers as described in connection with FIG. 2. In one or more embodiments, the data stream includes information specifying the destination of the data. The destination, in this example, is not the host system, but rather another kernel circuit referred to as a receiving kernel circuit. In one or more other embodiments, the stream traffic manager circuitry is configured, e.g., using the mapping data as previously described, to route data from the sending kernel circuit to another destination such as a receiving kernel circuit and/or the host system. In block 515, the stream traffic manager circuitry determines the receiving kernel circuit. Stream traffic manager circuitry, for example, is capable of reading the data stream stored in the output buffer of the sending kernel circuit and determining the specified receiving kernel circuit. In another example, the stream traffic manager determines the receiving kernel circuit based upon the mapping data stored therein (e.g., a mapping of particular kernel circuit outputs to destinations).

In block 520, the stream traffic manager circuitry determines whether the input buffer of the receiving kernel circuit has sufficient space available to store the data stream from the sending kernel circuit. In block 525, in response to determining that the input buffer of the receiving kernel circuit has sufficient space, the stream traffic manager circuitry initiates a data transfer from the sending kernel circuit to the receiving kernel circuit. The stream traffic manager circuitry transfers the data from the output buffer of the sending kernel circuit to the input buffer of the receiving kernel circuit through the interconnect(s) and/or the transceivers if a cross-IC data transfer is performed. In one or more embodiments, when transferring data between kernel circuits in a same die, the data may sent through the relevant interconnect under control of the stream traffic manager circuitry without passing through the stream traffic manager circuitry.

In particular embodiments, the data stream from the sending kernel circuit includes one or more instructions in-band within the data stream. In one example, the instructions are included in the payload portion of the data stream (or packetized data) from the sending kernel circuit to the receiving kernel circuit. As discussed, the output buffer of the sending kernel circuit converts the data stream into packetized data for sending to the receiving kernel circuit. The input buffer of the receiving kernel circuit converts the received packetized data into a data stream that is provided to the receiving kernel circuit.

In the example of FIG. 5, it should be appreciated that data streams can be sent from a kernel circuit in die 404 to a kernel circuit in die 406 or may be sent from a kernel circuit in die 406 to a kernel circuit in die 404. Similarly, data streams can be sent from a kernel circuit in die 408 to a kernel circuit in die 410 or may be sent from a kernel circuit in die 410 to a kernel circuit in die 408.

The example of FIG. 5 references the stream traffic manager circuitry. In this regard, method 500 may be performed where the stream traffic manager performs the operations described (e.g., where both sending and receiving kernel circuits are in IC 104), the satellite stream traffic manager performs the operations described (where both sending and receiving kernel circuits are in IC 402), or both the stream traffic manager and the satellite stream traffic manager perform the operations (e.g., where the sending and receiving kernel circuits are in different ICs). In the latter case, it should be appreciated that each of the stream traffic manager and the satellite stream traffic manager interact with the kernel circuit located in the same IC.

For example, where the sending kernel circuit and the receiving kernel circuit are located in different ICs, the stream traffic manager and the satellite stream traffic manager are capable of communicating via transceivers 442 and 444 to determine the status of input and output buffers of kernel circuits. For example, stream traffic manager is capable of determining the status of buffers in IC 104, while satellite stream traffic manager is capable of determining the status of buffers in IC 402. The stream traffic manager is capable of requesting the status of any buffer in IC 402 from the satellite stream traffic manager, which responds with the requested status(es). Similarly, the satellite stream traffic manager is capable of requesting the status of any buffer in IC 104 from the stream traffic manager, which responds with the requested status(es). The communication between the stream traffic manager and the satellite stream traffic manager supports the sending and receiving kernel circuits being located in the same die of IC 104 or in different dies of IC 104, in the same die of IC 402 or in different dies of IC 402, or in different ICs.

Figure 6:
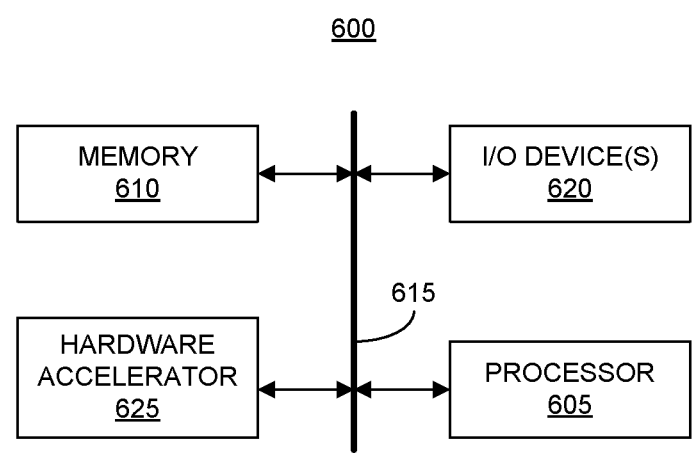
FIG. 6 illustrates an example system for use with one or more embodiments described herein.

FIG. 6 illustrates an example system 600 for use with one or more embodiments described herein. System 600 is an example of computer hardware that may be used to implement a computer, a server, a portable computer such as a laptop or a tablet computer, or other data processing system. For example, system 600 is an example implementation of host system 102 and/or another system that executes an EDA application to generate container files as described herein.

In the example of FIG. 6, system 600 includes at least one processor 605. Processor 605 is coupled to memory 610 through interface circuitry 615. System 600 is capable of storing computer readable instructions (also referred to as "program code") within memory 610. Memory 610 is an example of computer readable storage media. Processor 605 is capable of executing the program code accessed from memory 610 via interface circuitry 615.

Memory 610 may include one or more physical memory devices such as, for example, a local memory and a bulk storage device. Local memory refers to non-persistent memory device(s) generally used during actual execution of program code. Examples of local memory include RAM and/or any of the various types of RAM that are suitable for use by a processor during execution of program code (e.g., dynamic RAM or "DRAM" or static RAM or "SRAM"). A bulk storage device refers to a persistent data storage device. Examples of bulk storage devices include, but are not limited to, a hard disk drive (HDD), a solid-state drive (SSD), flash memory, a read-only memory (ROM), an erasable programmable read-only memory (EPROM), electrically erasable programmable read-only memory (EEPROM), or other suitable memory. System 600 may also include one or more cache memories (not shown) that provide temporary storage of at least some program code to reduce the number of times program code must be retrieved from a bulk storage device during execution.

Memory 610 is capable of storing program code and/or data. In one or more embodiments, when system 600 implements a system such as host system 102, memory 610 is capable of storing and executing a framework the same as or similar to that described in connection with FIG. 1. The framework may also include an operating system. One or more containers may also be stored in memory 610 for implementation within hardware accelerator 625 attached to system 600 through interface circuitry 615. Hardware accelerator 625 includes one or more ICs having an architecture the same as or similar to that described in connection with FIG. 7.

In one or more other embodiments, system 600 implements an EDA system that executes an EDA application. Accordingly, system 600 is capable of processing program code specifying kernels to generate kernel circuits specified as configuration bitstreams or partial configuration bitstreams as the case may be. System 600 includes the configuration bitstream(s) within a container file. Further, system 600 is capable of generating mapping information and including the mapping information within the container file as metadata. In embodiments where system 600 implements an EDA system, hardware accelerator 625 may or may not be included.

System 600, e.g., processor 605, is capable of executing an operating system, applications, and/or the framework described herein to perform the operations described within this disclosure. As such, the instructions and/or data stored in memory 610 may be considered an integrated part of system 600. Further, it should be appreciated that any data used, generated, and/or operated upon by system 600 (e.g., processor 605) are functional data structures that impart functionality when employed as part of the system.

Examples of interface circuitry 615 include, but are not limited to, a system bus and an input/output (I/O) bus. Interface circuitry 615 may be implemented using any of a variety of bus architectures. Examples of bus architectures may include, but are not limited to, Enhanced Industry Standard Architecture (EISA) bus, Accelerated Graphics Port (AGP), Video Electronics Standards Association (VESA) local bus, Universal Serial Bus (USB), and PCIe bus.

System 600 further may include one or more I/O devices 620 coupled to interface circuitry 615. I/O devices 620 may be coupled to system 600, e.g., interface circuitry 615, either directly or through intervening I/O controllers. Examples of I/O devices 620 include, but are not limited to, a keyboard, a display device, a pointing device, one or more communication ports, and a network adapter. A network adapter refers to circuitry that enables system 600 to become coupled to other systems, computer systems, remote printers, and/or remote storage devices through intervening private or public networks. Modems, cable modems, Ethernet cards, and wireless transceivers are examples of different types of network adapters that may be used with system 600.

System 600 may include fewer components than shown or additional components not illustrated in FIG. 6 depending upon the particular type of device and/or system that is implemented. In addition, the particular operating system, application(s), and/or I/O devices included may vary based upon system type. Further, one or more of the illustrative components may be incorporated into, or otherwise form a portion of, another component. For example, a processor may include at least some memory. System 600 may be used to implement a single computer or a plurality of networked or interconnected computers each implemented using the architecture of FIG. 6 or an architecture similar thereto.

Some ICs, referred to as programmable ICs, can be programmed to perform specified functions. One example of an IC that can be programmed is an FPGA. An FPGA typically includes an array of programmable tiles. These programmable tiles may include, for example, input/output blocks (IOBs), configurable logic blocks (CLBs), dedicated RAM blocks (BRAM), multipliers, digital signal processing blocks (DSPs), processors, clock managers, delay lock loops (DLLs), and so forth.

Each programmable tile typically includes both programmable interconnect circuitry and programmable logic circuitry. The programmable interconnect circuitry typically includes a large number of interconnect lines of varying lengths interconnected by programmable interconnect points (PIPs). The programmable logic circuitry implements the logic of a user design using programmable elements that may include, for example, function generators, registers, arithmetic logic, and so forth.

The programmable interconnect and programmable logic circuitries are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of programmable IC is the complex programmable logic device, or CPLD. A CPLD includes two or more "function blocks" connected together and to input/output (I/O) resources by an interconnect switch matrix. Each function block of the CPLD includes a two-level AND/OR structure similar to those used in programmable logic arrays (PLAs) and programmable array logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable ICs, the functionality of the device is controlled by data bits provided to the device for that purpose. The data bits may be stored in volatile memory (e.g., static memory cells, as in FPGAs and some CPLDs), in non-volatile memory (e.g., FLASH memory, as in some CPLDs), or in any other type of memory cell.

Other programmable ICs are programmed by applying a processing layer, such as a metal layer, that programmably interconnects the various elements on the device. These programmable ICs are known as mask programmable devices. Programmable ICs may also be implemented in other ways, e.g., using fuse or antifuse technology. The phrase "programmable IC" may include, but is not limited to, these devices and further may encompass devices that are only partially programmable. For example, one type of programmable IC includes a combination of hard-coded transistor logic and a programmable switch fabric that programmably interconnects the hard-coded transistor logic.

Figure 7:
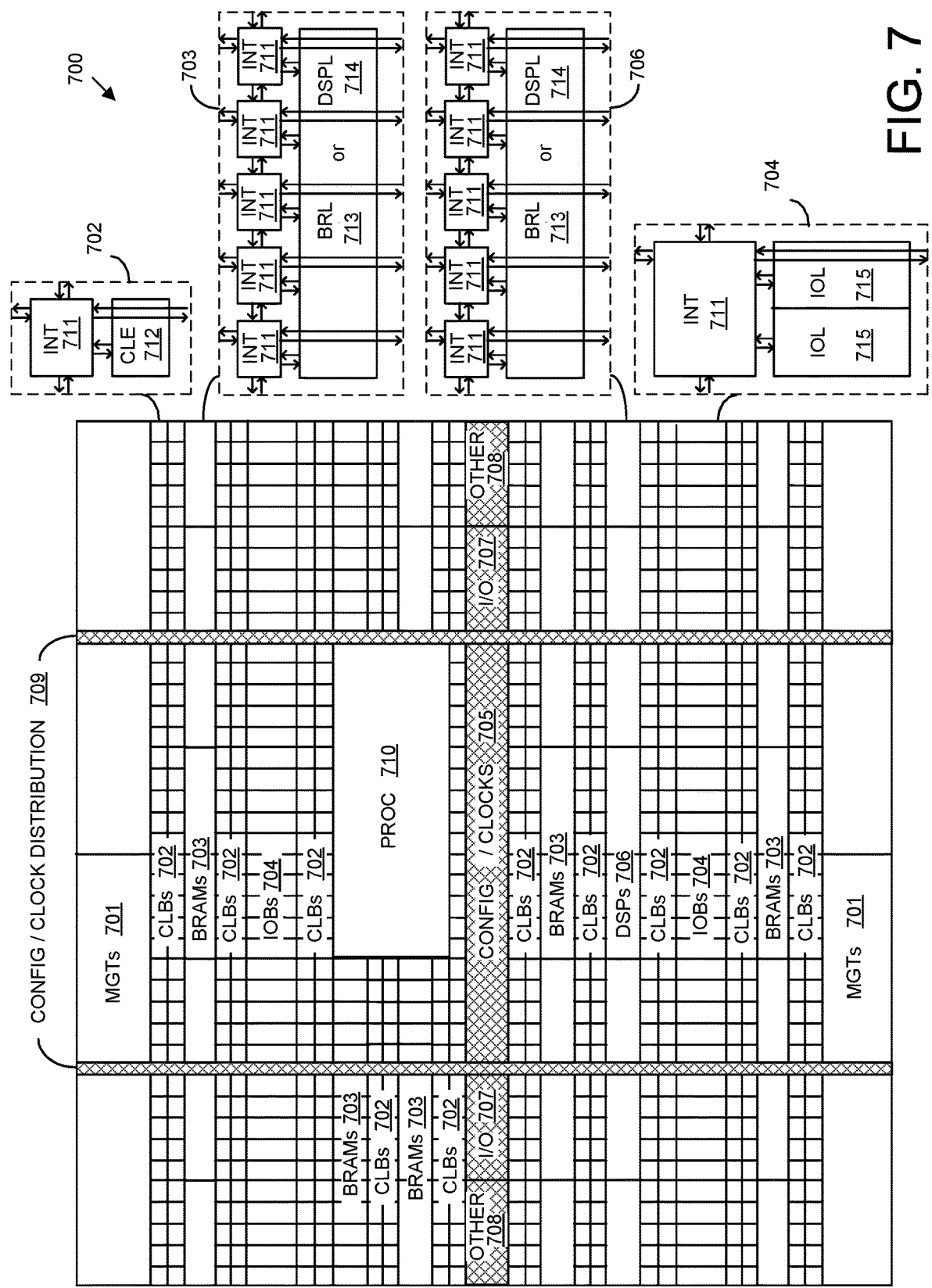
FIG. 7 illustrates an example architecture for an IC.

FIG. 7 illustrates an example architecture 700 for an IC. In one aspect, architecture 700 may be implemented within a programmable IC. For example, architecture 700 may be used to implement an FPGA. Architecture 700 may also be representative of a system-on-chip (SoC) type of IC. An SoC is an IC that includes a processor that executes program code and one or more other circuits. The other circuits may be implemented as hardwired circuitry, programmable circuitry, and/or a combination thereof. The circuits may operate cooperatively with one another and/or with the processor.

As shown, architecture 700 includes several different types of programmable circuit, e.g., logic, blocks. For example, architecture 700 may include a large number of different programmable tiles including multi-gigabit transceivers (MGTs) 701, configurable logic blocks (CLBs) 702, BRAMs 703, input/output blocks (IOBs) 704, configuration and clocking logic (CONFIG/CLOCKS) 705, digital signal processing blocks (DSPs) 706, specialized I/O blocks 707 (e.g., configuration ports and clock ports), and other programmable logic 708 such as digital clock managers, analog-to-digital converters, system monitoring logic, and so forth.

In some ICs, each programmable tile includes a programmable interconnect element (INT) 711 having standardized connections to and from a corresponding INT 711 in each adjacent tile. Therefore, INTs 711, taken together, implement the programmable interconnect structure for the illustrated IC. Each INT 711 also includes the connections to and from the programmable logic element within the same tile, as shown by the examples included at the top of FIG. 7.

For example, a CLB 702 may include a configurable logic element (CLE) 712 that may be programmed to implement user logic plus a single INT 711. A BRAM 703 may include a BRAM logic element (BRL) 713 in addition to one or more INTs 711. Typically, the number of INTs 711 included in a tile depends on the height of the tile. As pictured, a BRAM tile has the same height as five CLBs, but other numbers (e.g., four) also may be used. A DSP tile 706 may include a DSP logic element (DSPL) 714 in addition to an appropriate number of INTs 711. An IOB 704 may include, for example, two instances of an I/O logic element (IOL) 715 in addition to one instance of an INT 711. The actual I/O pads connected to IOL 715 may not be confined to the area of IOL 715.

In the example pictured in FIG. 7, a columnar area near the center of the die, e.g., formed of regions 705, 707, and 708, may be used for configuration, clock, and other control logic. Horizontal areas 709 extending from this column may be used to distribute the clocks and configuration signals across the breadth of the programmable IC.

Some ICs utilizing the architecture illustrated in FIG. 7 include additional logic blocks that disrupt the regular columnar structure making up a large part of the IC. The additional logic blocks may be programmable blocks and/or dedicated circuitry. For example, a processor block depicted as PROC 710 spans several columns of CLBs and BRAMs.

In one aspect, PROC 710 may be implemented as dedicated circuitry, e.g., as a hardwired processor, that is fabricated as part of the die that implements the programmable circuitry of the IC. PROC 710 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 710 may be omitted from architecture 700 and replaced with one or more of the other varieties of the programmable blocks described. Further, such blocks may be utilized to form a "soft processor" in that the various blocks of programmable circuitry may be used to form a processor that can execute program code as is the case with PROC 710.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 7 that are external to PROC 710 such as CLBs 702 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 710.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SoC, the configuration bitstream may specify the circuitry that is to be implemented within the programmable circuitry and the program code that is to be executed by PROC 710 or a soft processor. In some cases, architecture 700 includes a dedicated configuration processor that loads the configuration bitstream to the appropriate configuration memory and/or processor memory. The dedicated configuration processor does not execute user-specified program code. In other cases, architecture 700 may utilize PROC 710 to receive the configuration bitstream, load the configuration bitstream into appropriate configuration memory, and/or extract program code for execution.

FIG. 7 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 7 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 710 within the IC are for purposes of illustration only and are not intended as limitations.

As discussed, an IC implemented using architecture 700 or one similar thereto may be used to implement the streaming architectures described herein. In one or more embodiments, endpoint 108, DMA 110, stream traffic manager 212, satellite stream traffic manager 412, interconnects 214 and 216, buffers 218-232, and kernel circuits 234 may be implemented using programmable circuitry. In one or more other embodiments, selected ones of the circuit blocks such as endpoint 108, DMA 110, and/or interconnects may be implemented as hardened or hardwired circuit blocks. In one or more embodiments, the input buffers and/or output buffers can be implemented as AXI4-Stream Data FIFOs.

In particular embodiments, any buffers or queues described as being located in IC 104 may be implemented using available memory resources (e.g., BRAMs) or other similar circuit blocks available within IC 104 as opposed to using slower off-chip RAM. For example, buffers 218-232, queues in traffic stream manager 212, and/or queues in DMA 110 may be implemented using the memory resources available on the IC.

The architectures described herein are provided for purposes of illustration and not limitation. For example, an IC may include fewer or more kernel circuits that illustrated in the figures. Further, the number of queues in the driver and buffers implemented within the IC will vary based upon the number of kernel circuits implemented using programmable circuitry of the IC.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," "one or more embodiments," "particular embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," "in particular embodiments," and similar language throughout this disclosure may, but do not necessarily, all refer to the same embodiment. The terms "embodiment" and "arrangement" are used interchangeably within this disclosure.

As defined herein, the term "processor" means at least one hardware circuit capable of carrying out instructions contained in program code. The hardware circuit may be an integrated circuit. Examples of a processor include, but are not limited to, a central processing unit (CPU), an array processor, a vector processor, a digital signal processor (DSP), and a controller.

As defined herein, the term "output" means storing in physical memory elements, e.g., devices, writing to display or other peripheral output device, sending or transmitting to another system, exporting, or the like.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

In one or more embodiments, a system includes a host system and an IC coupled to the host system through a communication interface. The IC is configured for hardware acceleration. The IC includes a direct memory access circuit coupled to the communication interface, a kernel circuit, and a stream traffic manager circuit coupled to the direct memory access circuit and the kernel circuit. The stream traffic manager circuit is configured to control data streams exchanged between the host system and the kernel circuit.

In one aspect, the host system and the IC communicate by exchanging packetized data.

In another aspect, the IC includes interconnect circuitry connecting the stream traffic manager circuit and the kernel circuit.

In another aspect, the kernel circuit is one of a plurality of kernel circuits and the stream traffic manager circuit is configured to interleave data streams provided to the plurality of kernel circuits.

In another aspect, the IC includes an input buffer coupled to the interconnect circuitry and the kernel circuit, wherein the input buffer is configured to temporarily hold packetized data from the stream traffic manager circuit and convert the packetized data into a data stream provided to the kernel circuit. The IC further includes an output buffer coupled to the interconnect circuitry and the kernel circuit, wherein the output buffer is configured to temporarily hold a data stream output from the kernel circuit and convert the data stream into packetized data.

In another aspect, the host system includes a processor coupled to a memory, wherein the processor is configured to implement a write queue corresponding to the input buffer and a read queue corresponding to the output buffer in the memory. The write queue stores descriptors specifying data to be streamed to the input buffer. The read queue stores descriptors specifying data to be streamed from the output buffer to the memory of the host system.

In another aspect, the host system is configured to send packetized data with an in-band instruction to the kernel circuit.

In one or more embodiments, a method includes selecting, using computer hardware, a container file including a configuration bitstream specifying a kernel circuit and metadata for the kernel circuit, extracting, using the computer hardware, the configuration bitstream from the container file and loading the configuration bitstream within an IC to implement the kernel circuit within the IC, and determining, using the computer hardware, pipe properties from the metadata, wherein the pipe properties specify settings for streaming data to the kernel circuit from a host system. The method can also include implementing a data transfer directly from the host system to the kernel circuit as packetized data that is converted to a data stream and provided to the kernel circuit using the settings specified by the pipe properties.

In one aspect, the method includes implementing a further data transfer as a further data stream specifying a result from the kernel circuit directly to the host system.

In another aspect, the implementing a further data transfer includes determining whether a write queue corresponding to the kernel circuit located in the host system has space for receiving a complete packet of data and, in response to determining that the write queue does have space, initiating the data transfer from the kernel circuit to the host system.

In another aspect, the method includes sending the settings to a stream traffic manager circuit within the IC, wherein the stream traffic manager circuit implements the settings to stream data between the host system and the kernel circuit.

In another aspect, the method includes including an instruction for the kernel circuit in-band within the data stream.

In another aspect, the method includes determining that the data transfer is to be implemented as the data stream based on a data type used by a user application requesting the data transfer.

In another aspect, the implementing the data transfer includes determining whether an input buffer coupled to the kernel circuit within the IC has space for receiving data and, in response to determining that the input buffer does have space, initiating the data transfer to the kernel circuit.

In one or more embodiments, an IC includes a communication interface coupled to a host system, a direct memory access circuit coupled to the communication interface, a kernel circuit implemented using programmable circuitry, and a stream traffic manager circuit coupled to the direct memory access circuit and the kernel circuit. The stream traffic manager circuit is configured to control data streams exchanged between the host system and the kernel circuit.

In one aspect, the IC includes a first interconnect configured to receive packetized data from the stream traffic manager circuit and distribute the packetized data to the kernel circuit and a second interconnect configured to receive data from the kernel circuit and provide the data to the stream traffic manager circuit.

In another aspect, the IC includes an input buffer coupled to an output port of the first interconnect and to an input port of the kernel circuit, wherein the input buffer is configured to temporarily store the packetized data, convert the packetized data into a data stream, and provide the data stream to the kernel circuit. The stream traffic manager circuit initiates a data transfer to the kernel circuit in response to determining that the input buffer has space available.

In another aspect, the IC includes an output buffer coupled to an output port of the kernel circuit and to an input port of the stream traffic manager circuit, wherein the output buffer is configured to temporarily store a data stream output from the kernel circuit, convert the data stream into packetized data, and provide the packetized data to the second interconnect. The stream traffic manager circuit initiates a data transfer to the host system from the kernel circuit in response to determining that a buffer in the host system that corresponds to the output buffer has space available and that the output buffer includes at least one complete packet.

In another aspect, the kernel circuit is one of a plurality of kernel circuits implemented in the programmable circuitry. The stream traffic manager circuit is coupled to each of the plurality of kernel circuits and is configured to interleave data streams exchanged with the plurality of kernel circuits.

In another aspect, each kernel circuit of the plurality of kernel circuits is coupled to the stream traffic manager circuit through a buffer and an interconnect. The stream traffic manager circuit implements a round-robin arbitration scheme to stream data to each of the plurality of kernel circuits based upon space availability of the buffer corresponding to each respective kernel circuit.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A system, comprising:
   a host system; and
   an integrated circuit coupled to the host system through a communication interface and configured for hardware acceleration, wherein the integrated circuit includes:
     a direct memory access circuit coupled to the communication interface;
     a kernel circuit;
     a stream traffic manager circuit coupled to the direct memory access circuit and the kernel circuit, wherein the stream traffic manager circuit is configured to control data streams exchanged between the host system and the kernel circuit;
     a first stream interconnect configured to receive data streams from the stream traffic manager circuit and distribute the data streams to the kernel circuit; and
     a second stream interconnect configured to receive data streams from the kernel circuit and provide the data streams to the stream traffic manager circuit.

2. The system of claim 1, wherein the host system and the kernel circuit communicate directly with one another using the data streams.

3. The system of claim 1, wherein the stream traffic manager circuit is configured to provide a selected data stream directly from the host system to the kernel circuit.

4. The system of claim 1, wherein the integrated circuit further comprises:
   an input buffer coupled to the first stream interconnect and the kernel circuit, wherein the input buffer is configured to temporarily hold data streamed from the stream traffic manager circuit to the kernel circuit; and
   an output buffer coupled to the second stream interconnect and the kernel circuit, wherein the output buffer is configured to temporarily hold data streamed from the kernel circuit to the stream traffic manager circuit.

5. The system of claim 1, wherein the host system is configured to send the data streams with an in-band instruction to the kernel circuit.

6. The system of claim 3, wherein the stream traffic manager circuit is configured to provide a further data stream directly from the kernel circuit to the host system.

7. The system of claim 4, wherein the host system includes:
   a processor coupled to a memory, wherein the processor is configured to implement a write queue corresponding to the input buffer and a read queue corresponding to the output buffer in the memory, wherein the write queue stores descriptors specifying data to be streamed to the input buffer and the read queue stores descriptors specifying data to be streamed from the output buffer to the memory of the host system.

8. A method, comprising:
   selecting, using computer hardware, a container file including a configuration bitstream specifying a kernel circuit and metadata for the kernel circuit;
   extracting, using the computer hardware, the configuration bitstream from the container file and loading the configuration bitstream within an integrated circuit to implement the kernel circuit within the integrated circuit;
   determining, using the computer hardware, pipe properties from the metadata, wherein the pipe properties specify settings for streaming data to the kernel circuit from a host system; and
   implementing a data transfer directly from the host system to the kernel circuit as a data stream using the settings specified by the pipe properties.

9. The method of claim 8, further comprising:
   implementing a further data transfer as a further data stream specifying a result from the kernel circuit directly to the host system.

10. The method of claim 8, further comprising:
    sending the settings to a stream traffic manager circuit within the integrated circuit, wherein the stream traffic manager circuit implements the settings to stream data between the host system and the kernel circuit.

11. The method of claim 8, further comprising:
    including an instruction for the kernel circuit in-band within the data stream.

12. The method of claim 8, further comprising:
    determining that the data transfer is to be implemented as the data stream based on a data type used by a user application requesting the data transfer.

13. The method of claim 8, wherein the implementing the data transfer comprises:
    determining whether an input buffer coupled to the kernel circuit within the integrated circuit has space for receiving data; and
    in response to determining that the input buffer does have space, initiating the data transfer to the kernel circuit.

14. The method of claim 9, wherein the implementing a further data transfer comprises:

determining whether a write queue corresponding to the kernel circuit located in the host system has space for receiving data; and in response to determining that the write queue does have space, initiating the data transfer from the kernel circuit to the host system.

15. An integrated circuit, comprising:
a communication interface coupled to a host system;
a direct memory access circuit coupled to the communication interface;
a kernel circuit implemented using programmable circuitry;
a stream traffic manager circuit coupled to the direct memory access circuit and the kernel circuit, wherein the stream traffic manager circuit is configured to control data streams exchanged between the host system and the kernel circuit;
a first stream interconnect configured to receive data streams from the stream traffic manager circuit and distribute the data streams to the kernel circuit; and
a second stream interconnect configured to receive data streams from the kernel circuit and provide the data streams to the stream traffic manager circuit.

16. The integrated circuit of claim 15, further comprising:
an input buffer coupled to an output port of the first stream interconnect and to an input port of the kernel circuit, wherein the input buffer is configured to temporarily store data provided to the kernel circuit;
wherein the stream traffic manager circuit initiates a data transfer to the kernel circuit in response to determining that the input buffer has space available.

17. The integrated circuit of claim 15, wherein the programmable circuitry implements a plurality of kernel circuits, the stream traffic manager circuit is coupled to each of the plurality of kernel circuits and is configured to control the data streams exchanged between each kernel circuit of the plurality of kernel circuits and the host system.

18. The integrated circuit of claim 16, further comprising:
an output buffer coupled to an output port of the kernel circuit and to an input port of the stream traffic manager circuit, wherein the output buffer is configured to temporarily store data output from the kernel circuit;
wherein the stream traffic manager circuit initiates a data transfer to the host system from the kernel circuit in response to determining that a buffer in the host system that corresponds to the output buffer has space available.

19. The integrated circuit of claim 17, wherein each kernel circuit of the plurality of kernel circuits is coupled to the stream traffic manager circuit through a buffer and a stream interconnect, wherein the stream traffic manager circuit implements a round-robin arbitration scheme to stream data to each of the plurality of kernel circuits based upon space availability of the buffer corresponding to each respective kernel circuit.

* * * * *